United States Patent
Jones et al.

(10) Patent No.: US 12,361,811 B2
(45) Date of Patent: Jul. 15, 2025

(54) SYSTEM FOR MONITORING VEHICLE RIDERS

(71) Applicant: Western Power Sports, LLC, Boise, ID (US)

(72) Inventors: Michael K. Jones, Boise, ID (US); Jeremy Len Lathrop, Meridian, ID (US)

(73) Assignee: Western Power Sports, LLC, Boise, ID (US)

( * ) Notice: Subject to any disclaimer, the term of this patent is extended or adjusted under 35 U.S.C. 154(b) by 0 days.

(21) Appl. No.: 17/927,440

(22) PCT Filed: Aug. 31, 2022

(86) PCT No.: PCT/US2022/042253
§ 371 (c)(1),
(2) Date: Nov. 23, 2022

(87) PCT Pub. No.: WO2023/075926
PCT Pub. Date: May 4, 2023

(65) Prior Publication Data
US 2024/0242586 A1    Jul. 18, 2024

Related U.S. Application Data

(60) Provisional application No. 63/273,715, filed on Oct. 29, 2021.

(51) Int. Cl.
*G08B 21/18* (2006.01)
(52) U.S. Cl.
CPC .................... *G08B 21/18* (2013.01)
(58) Field of Classification Search
CPC ........ G08B 21/18; G05D 1/0022; G05D 1/24; G05D 1/0088; G05D 1/0212;
(Continued)

(56) References Cited

U.S. PATENT DOCUMENTS

| 4,833,726 A | 5/1989 | Shinoda et al. |
| 5,871,271 A | 2/1999 | Chien |

(Continued)

FOREIGN PATENT DOCUMENTS

| CA | 2023088 C | 12/2000 |
| CN | 206822084 U * | 1/2018 |

(Continued)

OTHER PUBLICATIONS

International Search Report and Written Opinion of the International Searching Authority in International Patent Application No. PCT/US2022/042248, mailed Dec. 6, 2022, 16 pages.

(Continued)

*Primary Examiner* — Brian A Zimmerman
*Assistant Examiner* — Anthony D Afrifa-Kyei
(74) *Attorney, Agent, or Firm* — Lowe Graham Jones PLLC

(57) ABSTRACT

The present disclosure relates to a system and a method for monitoring vehicle riders and vehicles. The system comprises a plurality of sensors associated with a rider and an electronic device. The plurality of sensors detects at least one condition or performance of the rider and generate corresponding first set of signals. The electronic device receives first set of signals and generate a second set of signals. The second set of signals may be sent to one or more user devices for analyzing the detected at least one condition or the performance of the rider. The system further includes some of the plurality of sensors associated with a corresponding vehicle of the rider to detect at least one condition or performance of the corresponding vehicle. The system further indicates the detected at least one condition or the performance of the rider and/or the corresponding vehicle on one or more indicators.

34 Claims, 17 Drawing Sheets

(58) Field of Classification Search
CPC ...... G05D 1/0287; G05D 1/224; G05D 1/225;
G05D 1/226; G05D 1/227; G05D 1/228;
G05D 1/229; G05D 1/646; G05D 1/69;
G05D 1/692; G06Q 30/0265; G06Q
30/0208; G06Q 50/188; G06Q 50/40;
G06Q 30/0281; G06Q 50/01; A61B
5/165; A61B 5/168; A61B 5/6893; A61B
5/7264; A61B 2503/22; A61B 2562/0219;
A61B 2562/0223; A61B 5/0059; A61B
5/0533; A61B 5/1176; A61B 5/163; A61B
5/369; B60W 40/08; B60W 2040/0881;
G01C 21/3438; G01C 21/3461; G01C
21/3469; G01C 21/3617; G01C 21/3484;
G05B 13/027; G06F 18/2414; G06F
40/40; G06N 20/00; G06N 3/0418; G06N
3/044; G06N 3/045; G06N 3/08; G06N
3/086; G06N 3/126; G06N 3/02; G06N
3/048; G06V 10/764; G06V 10/82; G06V
20/56; G06V 20/59; G06V 20/597; G06V
20/64; G07C 5/006; G07C 5/008; G07C
5/02; G07C 5/08; G07C 5/0808; G07C
5/0816; G07C 5/0866; G07C 5/0891;
G10L 15/16; G10L 25/63; G08G 1/0968;
G08G 1/20; Y02T 10/70; Y02T 10/7072;
Y02T 10/00; Y02T 10/60; Y02T 90/12
See application file for complete search history.

(56) References Cited

U.S. PATENT DOCUMENTS

| | | |
|---|---|---|
| 6,826,509 B2 | 11/2004 | Crisco, III et al. |
| 7,386,401 B2 | 6/2008 | Vock et al. |
| 7,526,389 B2 | 4/2009 | Greenwald et al. |
| 8,001,623 B2 | 8/2011 | Gertsch et al. |
| 8,232,881 B2 | 7/2012 | Hertz |
| 8,554,509 B2 | 10/2013 | Crisco, III et al. |
| 9,007,217 B1 | 4/2015 | Anvari |
| 9,075,405 B1 | 7/2015 | Anvari |
| 9,226,707 B2 | 1/2016 | Huang |
| 9,247,779 B1 | 2/2016 | Aloumanis et al. |
| 9,445,639 B1 | 9/2016 | Aloumanis et al. |
| 9,451,795 B2 | 9/2016 | Krueger |
| 9,549,583 B2 | 1/2017 | Pietrzak et al. |
| 9,596,901 B1 | 3/2017 | Anvari |
| 9,597,567 B1 | 3/2017 | Tran et al. |
| 9,622,661 B2 | 4/2017 | Crisco, III et al. |
| 9,861,151 B2 | 1/2018 | Ciaramelletti et al. |
| 9,900,669 B2 | 2/2018 | Touma et al. |
| 10,045,740 B2 | 8/2018 | John |
| 10,105,076 B2 | 10/2018 | Chu et al. |
| 10,123,582 B2 | 11/2018 | Crossman et al. |
| 10,271,606 B2 | 4/2019 | Auerbach |
| 10,390,579 B2 | 8/2019 | Zukowski |
| 10,586,437 B1 | 3/2020 | Slavin et al. |
| 10,653,199 B2 | 5/2020 | Olivares Velasco |
| 10,736,370 B2 * | 8/2020 | Chen .................. A42B 3/044 |
| 10,827,795 B2 | 11/2020 | Miller, II |
| 10,873,837 B2 | 12/2020 | Tran et al. |
| 10,945,601 B2 | 3/2021 | Greenwald et al. |
| 2013/0144175 A1 | 6/2013 | Lambert et al. |
| 2016/0058092 A1 | 3/2016 | Aldino et al. |
| 2016/0106174 A1 | 4/2016 | Chung et al. |
| 2016/0210834 A1 | 7/2016 | Dayal |
| 2017/0006955 A1 | 1/2017 | Dow, II |
| 2017/0172243 A1 | 6/2017 | Scripa et al. |
| 2017/0225742 A1 | 8/2017 | Hancock et al. |
| 2018/0005503 A1 | 1/2018 | Kaindl |
| 2018/0050696 A1 * | 2/2018 | Misu .................. A61B 5/6893 |
| 2019/0142097 A1 | 5/2019 | Moor |
| 2019/0166945 A1 | 6/2019 | Martin |
| 2020/0060374 A1 | 2/2020 | Glover et al. |
| 2020/0345095 A1 | 11/2020 | Olivares Velasco |
| 2021/0005072 A1 | 1/2021 | Dinkins |
| 2021/0045486 A1 | 2/2021 | Park et al. |
| 2021/0052029 A2 | 2/2021 | Becker et al. |
| 2021/0145450 A1 | 5/2021 | Gruentzig |
| 2021/0272394 A1 * | 9/2021 | Cella .................. G06Q 30/0207 |

FOREIGN PATENT DOCUMENTS

| | | | |
|---|---|---|---|
| CN | 110403289 A | 11/2019 | |
| CN | 210581168 U | 5/2020 | |
| CN | 212994760 U | 4/2021 | |
| DE | 102011115193 A1 | 3/2013 | |
| DE | 102019202330 A1 * | 8/2020 | ............ B62J 45/414 |
| EP | 2892020 A1 * | 7/2015 | ............ G06Q 40/08 |
| EP | 3509047 B1 | 7/2020 | |
| EP | 3801099 A1 | 4/2021 | |
| ES | 2610034 A1 | 4/2017 | |
| FR | 2722370 A1 | 1/1996 | |
| IN | 201741046325 A | 6/2019 | |
| IN | 211608337 U | 10/2020 | |
| IN | 201941040483 | 4/2021 | |
| JP | 2017178284 A * | 10/2017 | |
| KR | 101960722 B1 | 3/2019 | |
| WO | 2010/116017 A1 | 10/2010 | |
| WO | 2015/147909 | 10/2015 | |
| WO | 2018/050037 A1 | 3/2018 | |
| WO | 2020/072825 A1 | 4/2020 | |
| WO | 2020/095337 A1 | 5/2020 | |
| WO | 2020/123873 A1 | 6/2020 | |
| WO | 2020/217089 A1 | 10/2020 | |

OTHER PUBLICATIONS

International Search Report and Written Opinion of International Application No. PCT/US2022/042253 mailed on Nov. 25, 2022, 14 Pages.

Veena divya Krishnappa et al., A Compact Sensor System for Concussion Mitigation in Helmets—A Concept Prototype, Jan. 2015, 3 Pages.

Sreenithy Chandran et al., Konnect: An Internet of Things (IoT) Based Smart Helmet for Accident Detection and Notification, Dec. 2016, 2 Pages, IEEE Annual India Conference.

Ali Youssef et al., Towards Model-Based Online Monitoring of Cyclist's Head Thermal Comfort Smart Helmet Concept and Prototype, Aug. 2019, 11 Pages.

Mohd Khairul Afiq Mohd Rasli et al., Smart Helmet with Sensors for Accident Prevention, Dec. 5, 2013, 3 Pages, 2013 ICEESE, Kuala Lumpur, Malaysia.

Yiyang Zhuang et al., Fiber Optic Sensor Embedded Smart Helmet for Real-Time Impact Sensing and Analysis through Machine Learning, Journal of Neuroscience Methods, Mar. 1, 2021, 23 Pages, vol. 351.

Bethany Rowson et al., Chapter 23—Measuring Head Impacts: Accelerometers and Other Sensors, Handbook of Clinical Neurology, 2018, pp. 235-243, vol. 158.

David E. Krzeminski et al., Development of a Pressure Sensor Platform for Direct Measurement of Head Injury Criterion (HIC), ScienceDirect, Procedia Engineering 112 (2015), pp. 190-195.

H.C. Impana et al., A Review on Smart Helmet for Accident Detection Using IoT, EAI Endorsed Transactions on Internet of Things, May 14, 2020, 6 Pages.

Sofia Henriksson, Concept Development of Communications-Enabled Motorcycle Helmet, Master of Science Thesis Stockholm, Sweden 2008, 75 Pages.

* cited by examiner

SYSTEM FOR MONITORING VEHICLE RIDERS

FIELD OF THE DISCLOSURE

The present disclosure generally relates to systems and methods for monitoring vehicle riders. More particularly, the present disclosure relates to systems and methods for monitoring vehicle riders to determine their performance.

BACKGROUND

With an increased awareness of rider injuries, especially head injuries and with an increased number of interacting vehicles, monitoring of the vehicles and corresponding riders has become very crucial. Further, it is important to monitor vehicle riders in case of accidents. In such cases, it is difficult to determine level of injury of the riders from a distance. Also, monitoring of performance of athletes during a sporting event is important. Such monitoring gathers data corresponding to performance of the participants. The gathered data is analyzed to improve performance of the riders. Such monitoring also helps in determining any significant conditions such as any damage caused by an accident during the event.

There are different systems available to monitor vehicle riders. For instance, cameras are widely used to monitor vehicle riders. Different cameras are placed at different locations for getting different views of different roads/streets. Similarly, in sporting events, such as racing, different cameras are used. Different protective gear or accessories are used by vehicle riders. However, such cameras or such protective gear/accessories do not monitor different parameters associated with vehicle riders. Such systems also fail to detect level of injury in case of accidents or impacts.

SUMMARY OF THE DISCLOSURE

In some embodiments, the present disclosure sets forth a system for monitoring vehicle drivers. The system comprises a plurality of sensors and an electronic device. The plurality of sensors are configured to detect a plurality of parameters associated with a rider and are further configured to generate a first set of signals indicative of the plurality of parameters. The plurality of parameters represent at least one condition or performance of the rider. The plurality of sensors are further configured to detect a plurality of parameters associated with a corresponding vehicle of the rider. Such plurality of parameters associated with the corresponding vehicle represent at least one condition or performance of the vehicle. The electronic device is communicatively coupled to the plurality of sensors. The electronic device comprises a processing unit and a transceiver and is configured to receive the first set of signals from the plurality of sensors and generate a second set of signals.

The system may further comprise one or more user devices communicatively coupled to the electronic device using a communication network. The one or more user devices are configured to receive the second set of signals and analyze the received second set of signals to determine the at least one condition or the performance of the rider.

In some embodiments, the present disclosure relates to a method for monitoring vehicle riders. The method is performed on a system having a plurality of sensors and an electronic device having a processing unit and a transceiver. The method includes the step of detecting a plurality of parameters by the plurality of sensors and generating a first set of signals indicative of the plurality of parameters. In such embodiments, the plurality of parameters is associated with a rider and represents at least one condition or performance of the rider. The method further includes the steps of receiving the first set of signals by the electronic device and generating a second set of signals by the electronic device based on the first set of signals.

The method may comprise the step of detecting a plurality of parameters associated with a corresponding vehicle of the rider. The plurality of parameters associated with the corresponding vehicle represents at least one condition or performance of the vehicle.

The method further includes the steps of receiving the second set of signals by one or more user devices using a communication network and analyzing the received second set of signals by the one or more user devices to determine the at least one condition or the performance of the rider.

BRIEF DESCRIPTION OF THE DRAWINGS

A more complete understanding of the present disclosure may be derived by referring to the detailed description and claims when considered in connection with the Figures, wherein like reference numerals refer to similar elements throughout the Figures.

DETAILED DESCRIPTION

The following description is of exemplary embodiments of the invention only, and is not intended to limit the scope, applicability, or configuration of the invention. Rather, the following description is intended to provide a convenient illustration for implementing various embodiments of the invention. As will become apparent, various changes may be made in the function and arrangement of the elements described in these embodiments without departing from the scope of the invention as set forth herein. It should be appreciated that the description herein may be adapted to be employed with alternatively configured devices having different shapes, components, attachment mechanisms, and the like and still fall within the scope of the present invention. Thus, the detailed description herein is presented for purposes of illustration only and not of limitation.

Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment.

According to a first aspect of the present disclosure, systems for monitoring vehicle riders is disclosed. More particularly, the present disclosure sets forth "smart" systems that are stand-alone or integrated to measure performance criteria and/or measure and alert to safety concerns or conditions of vehicle riders. The smart systems may be applied to different accessories/gears used by the vehicle riders, such as a helmet and other protective gears, and corresponding vehicles, or any combination thereof. The system in accordance with the present disclosure includes human performance telemetry and real-time impact reporting. Optionally or in addition, the system includes one or more indicators to indicate performance of the riders and, in case of an impact, real-time impact and a level thereof.

Figure 1:
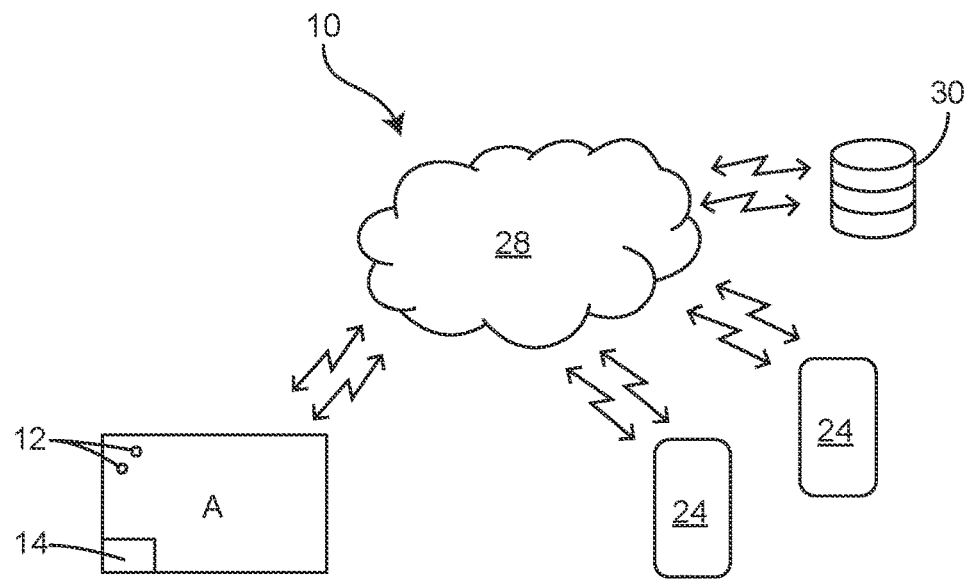
FIG. 1 illustrates an exemplary system for monitoring vehicle riders in accordance with the present disclosure.

Reference is now made to FIG. 1, which represents an exemplary system 10 for monitoring vehicle riders. The system 10 comprises a plurality of sensors 12. The plurality of sensors 12 are configured to detect a plurality of parameters associated with a rider. In particular, each of the plurality of sensors 12 is configured to detect a corresponding parameter associated with the rider. In some embodiments, the detected plurality of parameters may be associated with biometric parameters of the rider, such as heartrate, respiration rate, $O_2$ level, $VO_2$ level, hydration level, and the like. Optionally or in addition, the plurality of parameters may be non-biometric parameters and may be associated with external conditions affecting the rider, such as a force of impact/accident, a direction of travel or movement of the rider, and the like.

Some non-limiting examples of the plurality of sensors 12 are temperature sensor, $VO_2$ measurement sensor, $O_2$ measurement sensor, hydration sensor, haptic sensors such as a heartrate sensor, a respiration sensor, and the like. Such sensors may be configured to detect the corresponding parameters associated with the rider. In some embodiments, the plurality of sensors 12 may be configured to detect the associated parameters continuously. In other embodiments, the plurality of sensors 12 may be configured to detect the associated parameters at predefined intervals. In further embodiments, the plurality of sensors 12 may be configured to detect the associated parameters on occurrence of a specific event, such as an impact/accident.

The detected plurality of parameters may be utilized to determine performance or at least one condition from a plurality of conditions associated with the rider. Some non-limiting examples of the plurality of conditions associated with the rider are a normal condition, an elevated condition, an underrated condition, and the like. The normal condition may be referred to as a condition in which the plurality of measured parameters is within a corresponding predefined range. The elevated condition may be referred to as a condition in which the plurality of measured parameters is outside the corresponding predefined range. The underrated condition may be referred to as a condition in which the plurality of measured parameters is within the corresponding predefined range (or below the threshold). The plurality of conditions may further include conditions of the rider with respect to a level of impact or accident, such as a minor impact, a moderate impact, a severe impact, and the like.

Figure 2:
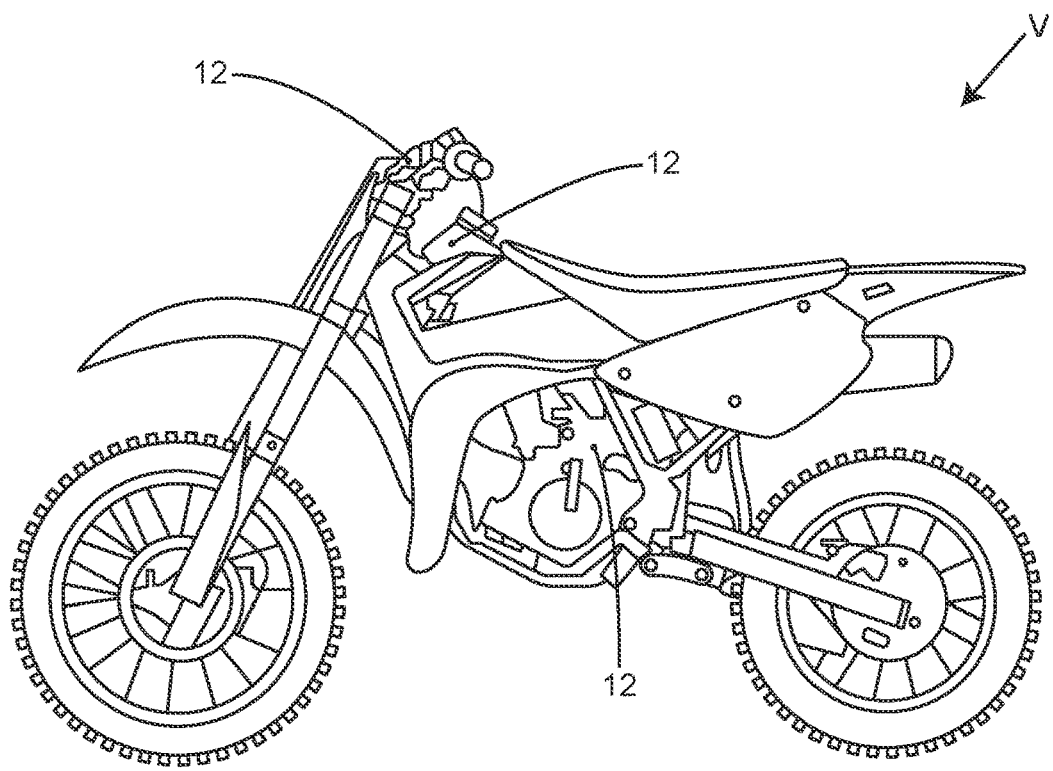
FIG. 2 illustrates an exemplary vehicle having a plurality of sensors placed thereon, in accordance with the present disclosure.

In some embodiments, the plurality of sensors 12 may be associated with a vehicle corresponding to the rider. An exemplary vehicle V having the plurality of sensors 12 is illustrated in FIG. 2. In such embodiments, some of the plurality of sensors 12 may be configured to measure a plurality of parameters associated with the vehicle. Some non-limiting examples of such parameters are decreasing speed or lap times, airtime (i.e., time on the ground versus time off the ground), a level and/or temperature of vehicle coolant, performance of a clutch, oil temperature, an engine speed, performance of a braking mechanism, an acceleration, cornering, jumping of the vehicle, lap segment times, and the like. Accordingly, the detected parameters associated with such sensors may be utilized to detect performance or at least one condition associated with the vehicle.

Optionally or additionally, the plurality of sensors 12 may comprise one or more kinetic sensors. Some non-limiting examples of such sensors are an accelerometer to detect a proper acceleration of the vehicle, an inclinometer to detect an angle of inclination of the vehicle with respect to the ground, a gyroscope meter to detect an orientation of the vehicle, or any other type of sensors capable of detecting movement and/or force. For example, multiple accelerometers may work together to detect the three-dimensional movement of a rider and/or vehicle. Such parameters are utilized to determine an overall performance of the rider along with the corresponding vehicle. For instance, some sensors may determine a speed or an angle of inclination of the rider at a particular place, for instance at a turn/curve, of a road/track along with a speed of the vehicle. Detection of the speed and the inclination at the particular place may determine performance of the rider and the vehicle. In some embodiments, the plurality of sensors 12 may comprise more than one similar type of sensors. For instance, the vehicle may have more than one, more particularly three, sensors to enable a multi-dimensional information map to inform at least one condition or the performance level of the rider and/or the corresponding vehicle to the rider, a coach, a manager, or a parent of the rider in real time.

The plurality of sensors 12 are configured to generate a first set of signals. In particular, each of the plurality of sensors 12 may be configured to generate a corresponding signal leading to the first set of signals. In some embodiments, the first set of signals may be a plurality of signals representing corresponding detected parameters associated with the rider and/or the corresponding vehicle. Accordingly, the first set of signals indicates the detected condition or the performance of the rider and/or the corresponding vehicle.

The system 10 further comprises an electronic device 14 communicatively coupled with the plurality of sensors 12. In some embodiments, the electronic device 14 may be connected to the plurality of sensors 12 using wired connections. In other embodiments, the electronic device 14 may be wirelessly connected to the plurality of sensors 12, e.g., using a Bluetooth communication, or a near-field communication.

Figure 3:
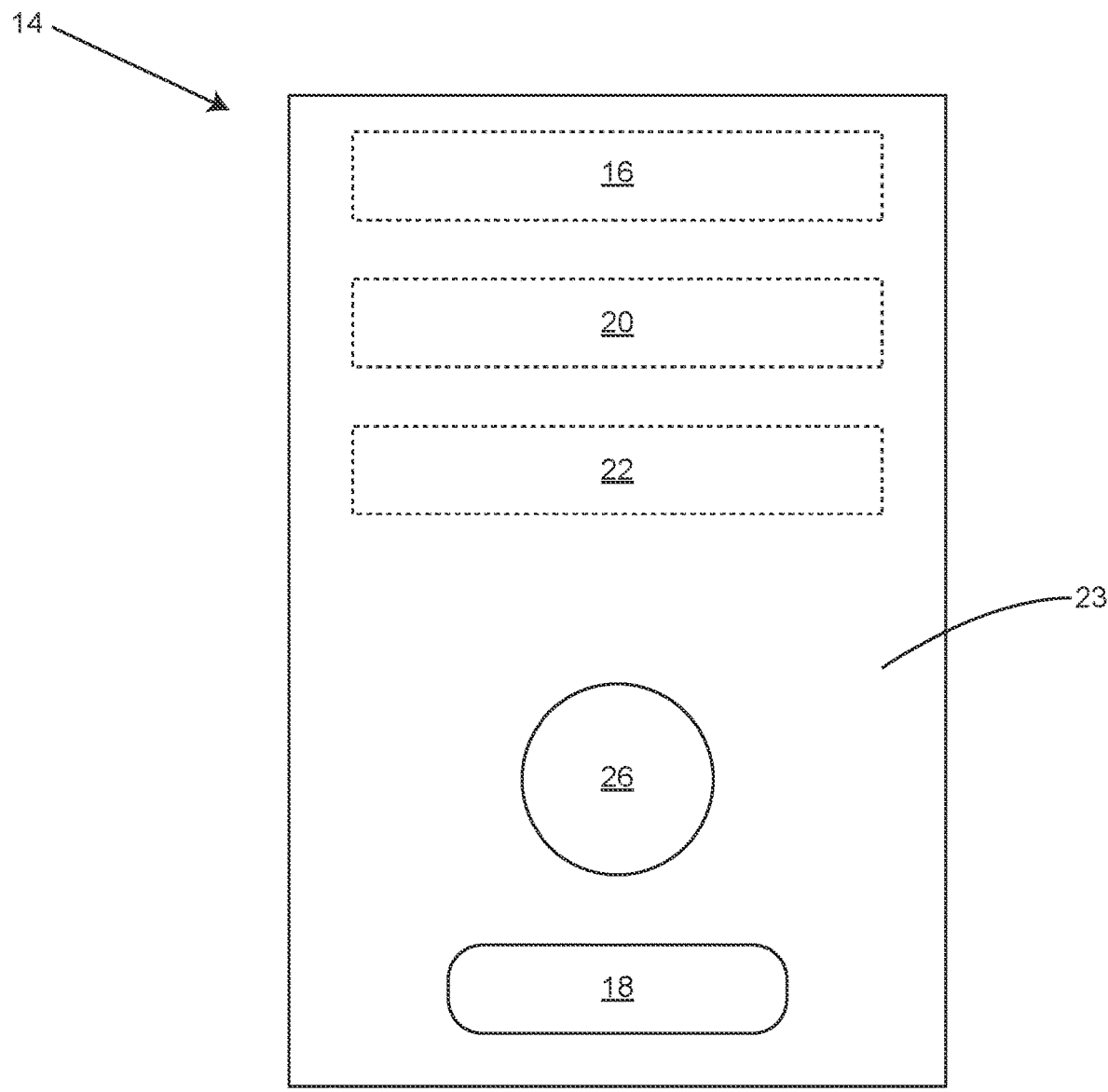
FIG. 3 illustrates an exemplary block diagram of an electronic device in accordance with the present disclosure.
Figure 4:
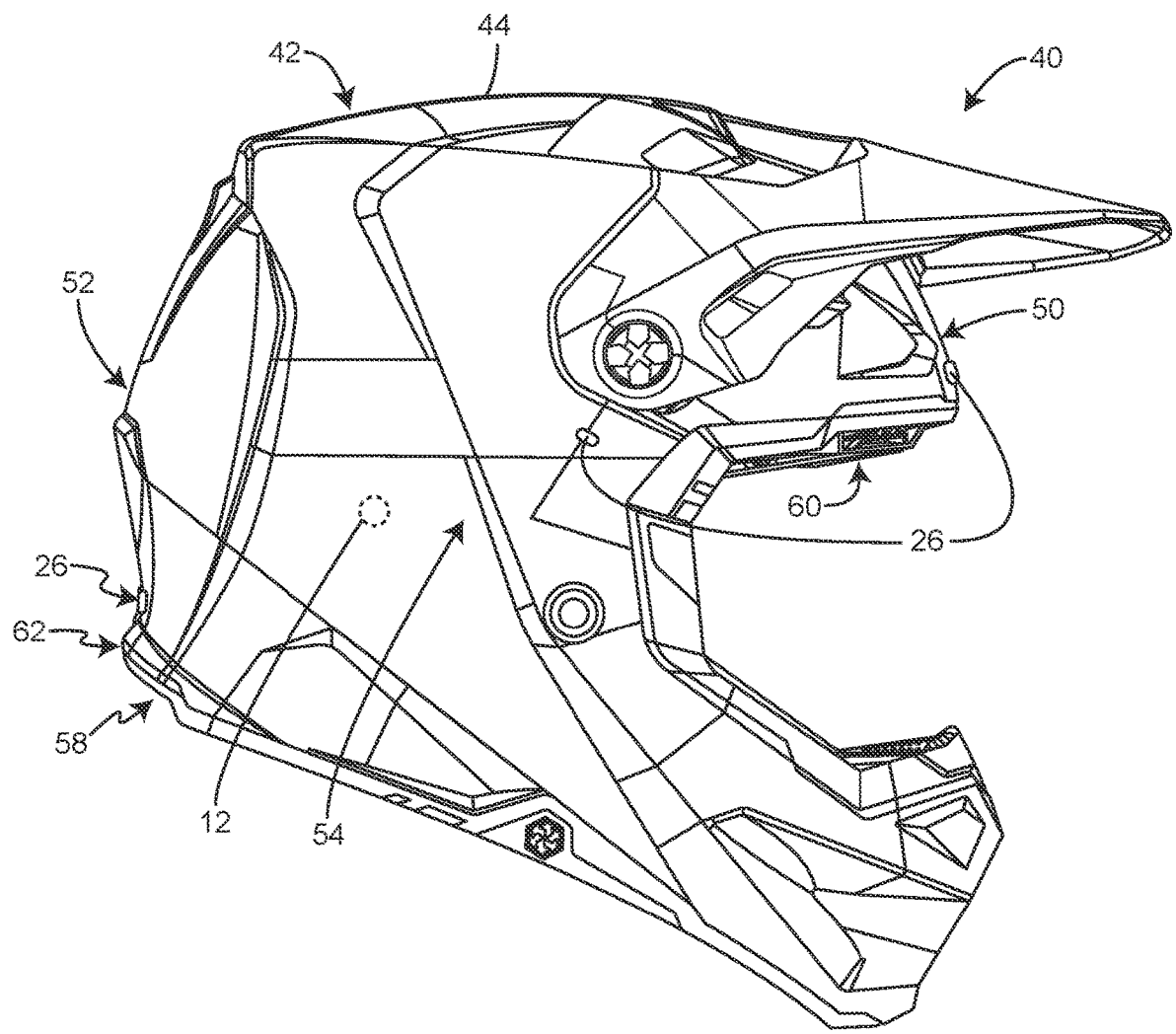
FIGS. 4-5 illustrate a side view and a perspective view, respectively, of a helmet in accordance with the present disclosure.
Figure 5:
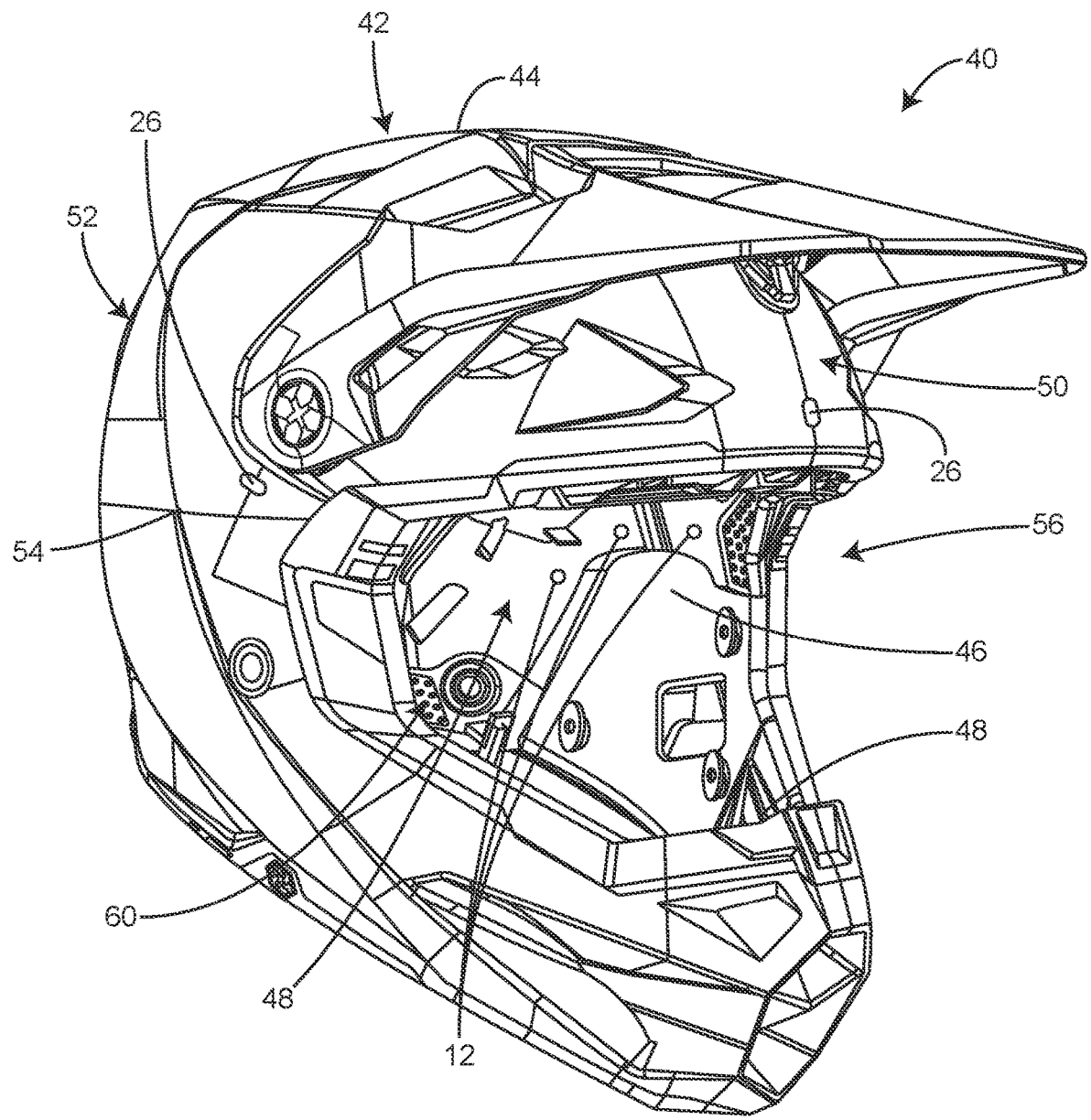
Figure 6:
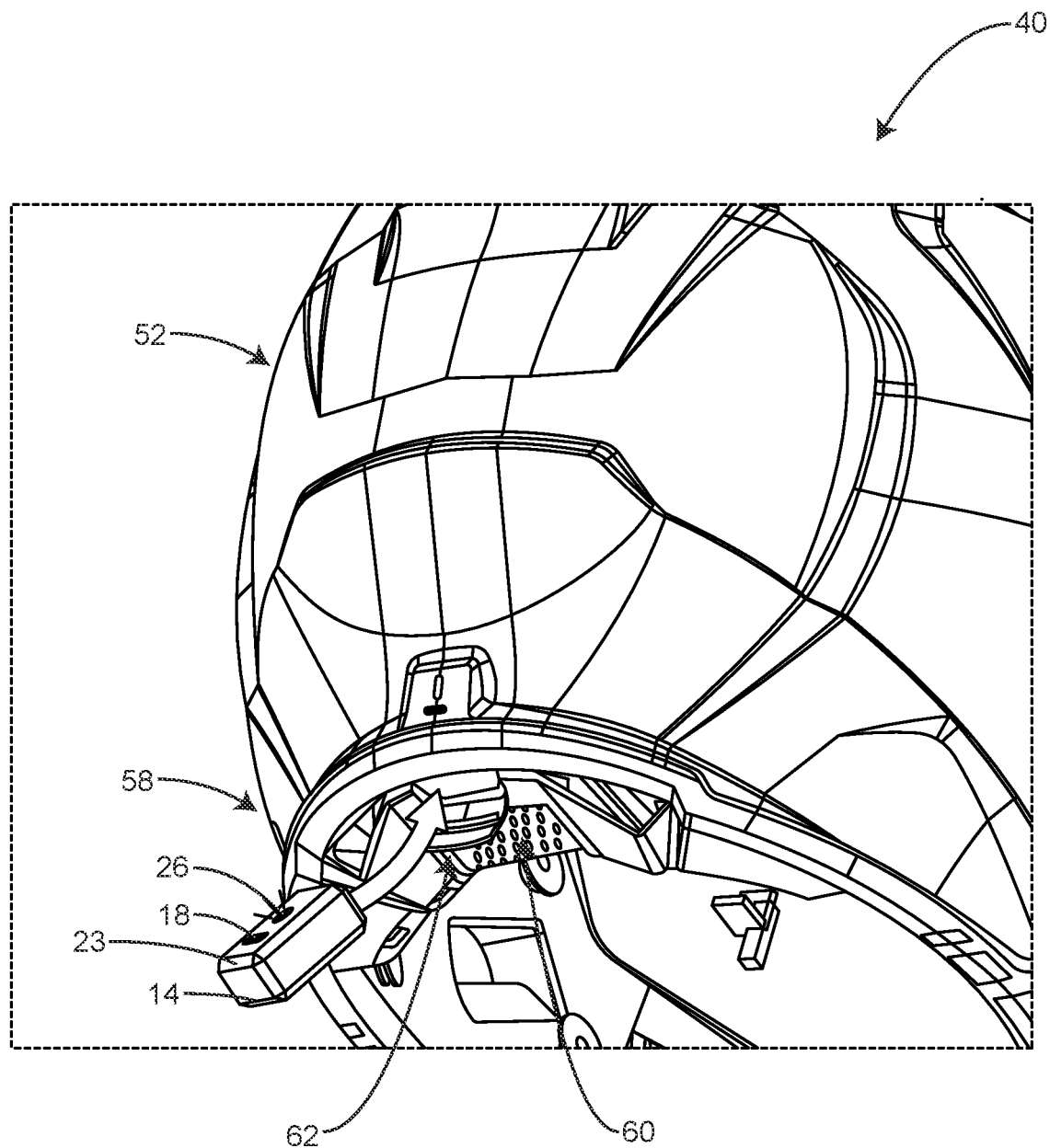
FIGS. 6-8 illustrate exemplary rear views of a helmet having an electronic device in accordance with the present disclosure.

FIG. 3 illustrates an exemplary block diagram of an electronic device 14 in accordance with the present disclosure. The electronic device 14 comprises a processing unit 16 and a transceiver 20. The electronic device 14 may be configured to receive the first set of signals generated by the plurality of sensors 12 and further configured to generate a second set of signals. More particularly, the processing unit 16 of the electronic device 14 may be configured to generate the second set of signals based on the first set of signals. The electronic device 14 may further comprise an I/O interface 18 and a memory unit 22. The first set of signals received from the plurality of sensors 12 are associated with respective values of the plurality of parameters, and the memory unit 22 may be configured to store the values associated with the first set of signals. The memory unit 22 may further be configured to store a threshold value corresponding to each of the plurality of parameters detected by the plurality of sensors 12. In a preferred embodiment, the processing unit 16 may receive the detected first set of signals and compare the values associated with the detected parameters with the corresponding threshold values to determine the corresponding second set of signals. For instance, a second set of signals may be configured to be generated if the values of detected parameters are more than or less than the corresponding threshold values.

The electronic device 14 may further include a first surface 23 having the I/O interface 18 and at least one visual indicator 26. It is to be noted that system 10 further comprises additional one or more indicators on at least one accessory, for instance an accessory A as shown in FIG. 1, and/or a corresponding vehicle, for instance a vehicle as shown in FIG. 2, as will detailed further below. The I/O interface 18 may be used to retrieve the first set of signals stored in the memory unit 22 for analysis of the retrieved first set of parameters. Such parameters may be analyzed to determine performance of the rider. Additionally, the I/O interface 18 may further be used to charge a battery of the electronic device 14. The at least one visual indicator 26 on the first surface 23 of the electronic device 14 may be configured to indicate at least one of the plurality of conditions or the performance of the rider and/or the corresponding vehicle.

In some exemplary embodiments, the electronic device 14 may be configured to generate one or more detecting signals. The one or more detecting signals may work as an indication or a trigger for one or more of the plurality of sensors 12 to detect the corresponding parameters. In some embodiments, the electronic device 14 may determine an instance for the plurality of sensors 12 to detect the corresponding parameters. For instance, in case of detection of heavy vibrations from a vibration sensor, the processing unit 16 may generate a detecting signal directing other sensors, e.g., a heartrate sensor, or a respiration sensor, to sense the corresponding parameters, such as a heartrate or a respiration rate, of the rider to determine the condition of the rider.

The electronic device 14 may be attached with at least one accessory/protective gear of the rider. It is to be noted that the terms 'accessory' and 'protective gear' refer to a protective layer that may be utilized by the rider to get protection from different external effects. The terms 'accessory' and 'protective gear' are used interchangeably without deterring to the scope of the present disclosure.

In some embodiments, the electronic device 14 may be inserted in at least one accessory A. Optionally, the electronic device 14 may be embedded into the at least one accessory A. Some non-limiting examples of the at least one accessory A are helmets, gloves, boots, armor suits, chest protectors, jackets, knee pads, elbow pads, portions of the vehicle (e.g., motorcycle), and the like. The electronic device 14 may be inserted or embedded into the at least one accessory A using a holder. The holder may be attached to the at least one accessory A within an interior part of the at least one accessory A. In some embodiments, the electronic device 14 may be a chip that can be inserted into the holder. In other embodiments, the electronic device 14 may be a small circuit enclosed in a box that can be inserted into the holder.

An electronic device 14 along with a holder 62 corresponding to an exemplary accessory A, such as a helmet 40, is illustrated in FIGS. 4-10. The helmet 40 in accordance with the present disclosure comprises an outer shell 42 defining a shape thereof and an inner liner 48 providing padding/cushioning to the rider. The outer shell 42 comprises an outer surface 44, an inner surface 46, a front part 50, a rear part 52, a first side part 54, and a second side part 56. The electronic device 14 may be placed within a holder 62 of an inner liner 48 of the helmet 40. The inner liner 48 may comprise an additional foam 60 attached therewith to provide additional cushioning/padding. For instance, the foam 60 may be attached to an inner side of the inner liner 48 at a first side and a second side corresponding to cheeks of the rider. The foam 60 may be placed at a back part of the inner liner 48 and adjacent to a bottom portion 58 of the outer shell 42 for providing support to neck of the rider. In an embodiment, the holder 62 is placed adjacent to a bottom trim of the helmet 40 at the rear part 52 thereof. The holder 62 comprises a cavity 70 and a closing mechanism 68. The cavity 70 and the closing mechanism 68 are configured to completely enclose the electronic device 14 therewithin.

In some embodiments, the cavity 70 may be carved within the inner liner 48. In other embodiments, the cavity 70 may be made of a specific material and may be placed within the inner liner 48. An opening of the cavity 70 is configured to be closed using the closing mechanism 68. The closing mechanism 68 comprises a door 72 and a corresponding flap 74 (seen e.g., in FIGS. 9-10). The door 72 may be a hinged door 72 and may be attached to a rigid outer support of the additional foam 60. The door 72 may be configured to attain a closed position and an open position. In the open position (seen e.g., in FIG. 9), the cavity 70 is open and can receive the electronic device 14 therewithin. Once the electronic device 14 is placed within the cavity 70, the door 72 may attain the closed position and the cavity 70 is closed by changing the door 72 to the closed position (seen e.g., in FIG. 10). In the closed position, the door 72 is engaged with the corresponding flap 74. The corresponding flap 74 may be attached to the outer shell 42 at the bottom portion 58 of the rear part 52.

Figure 7:
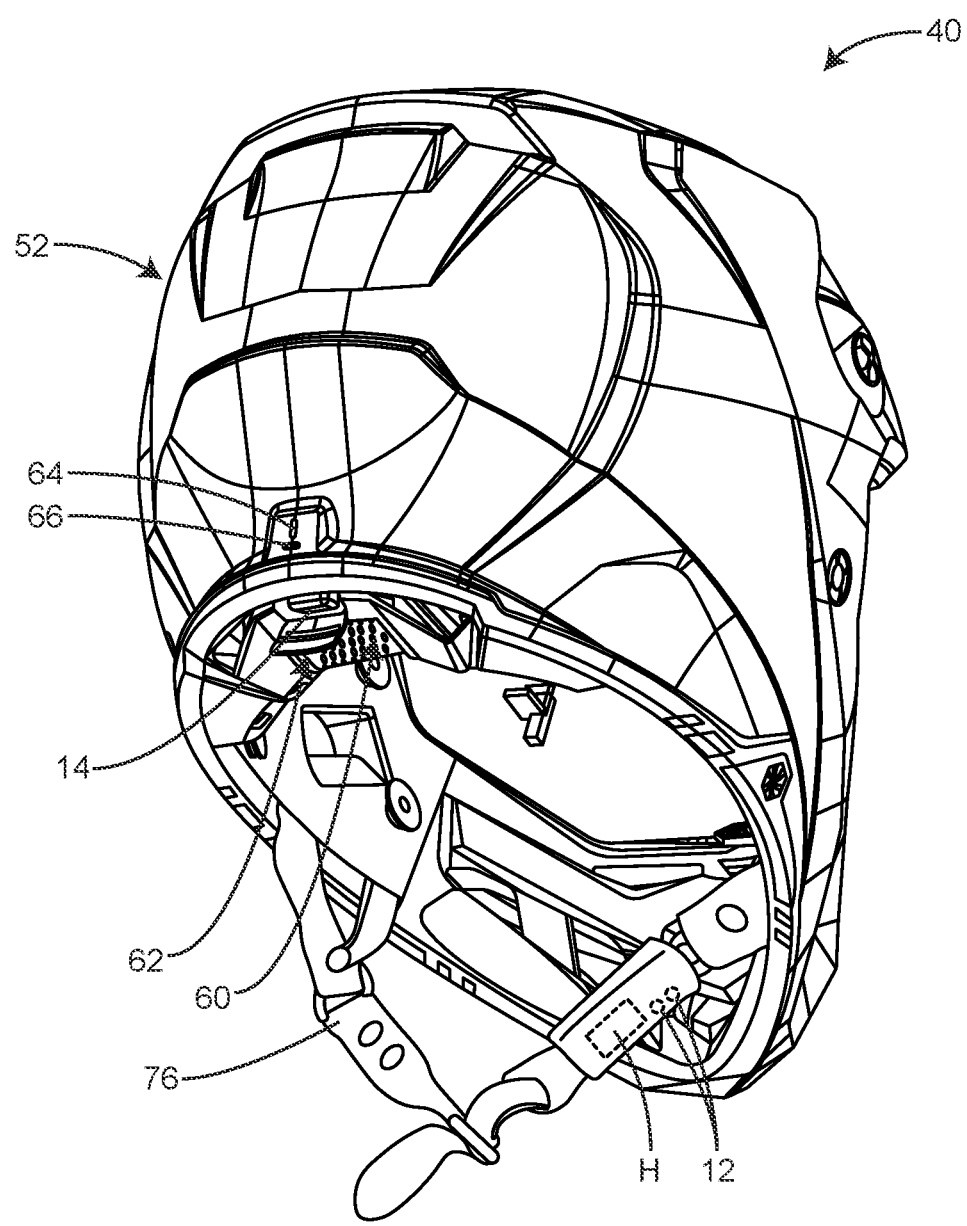
Figure 8:
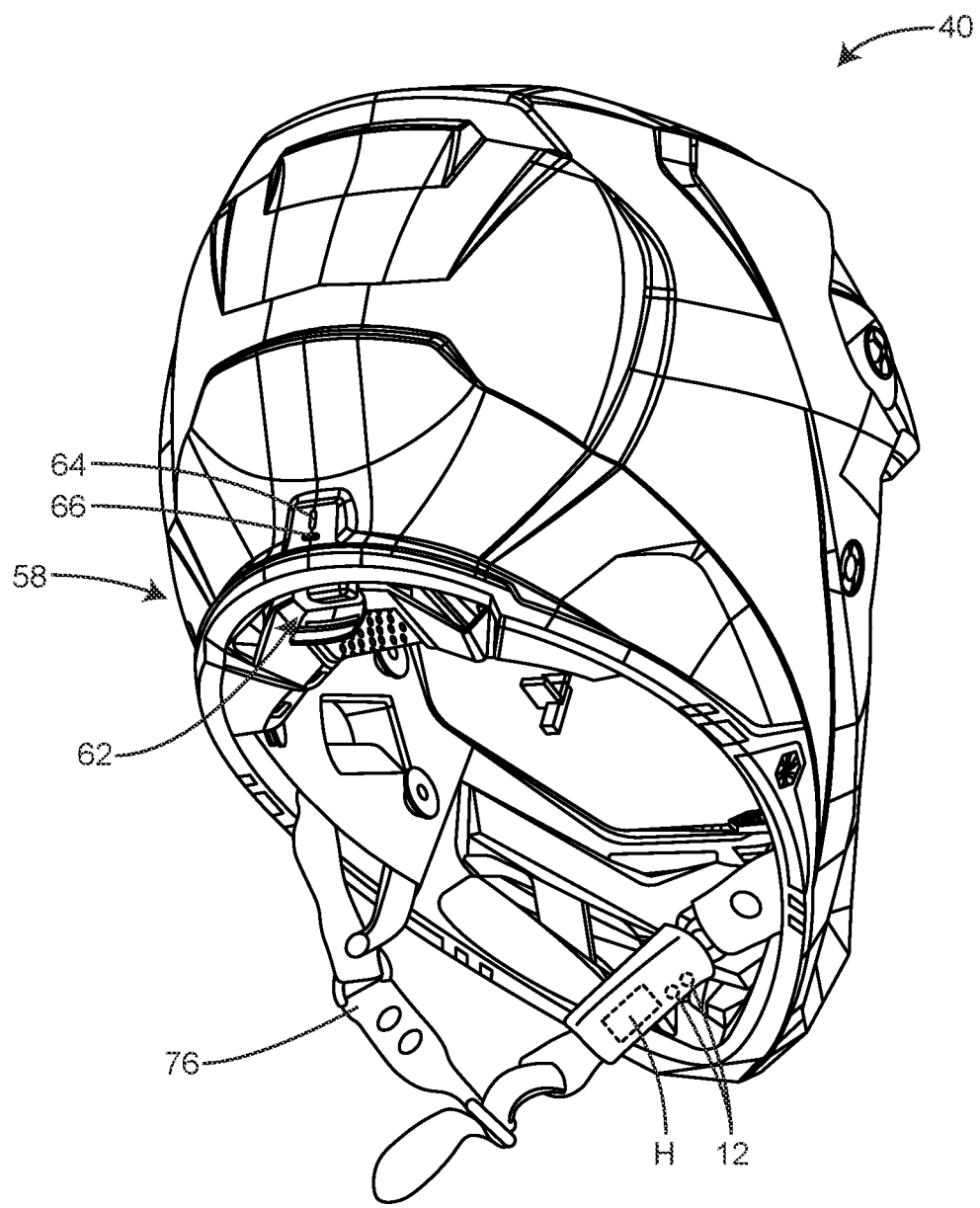
Figure 9:
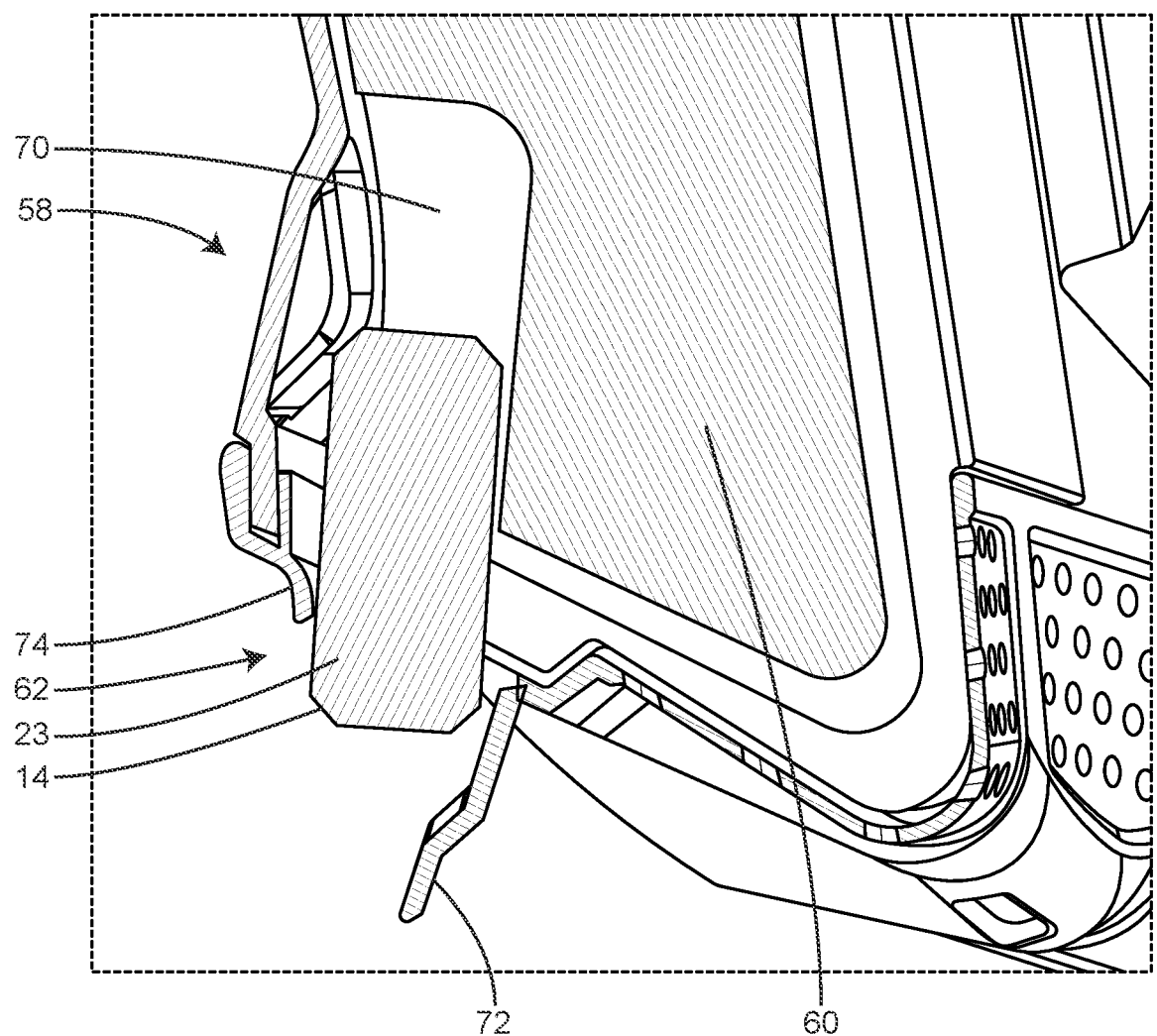
FIGS. 9-10 illustrate exemplary cross-section views of a holder for an electronic device in accordance with the present disclosure.
Figure 10:
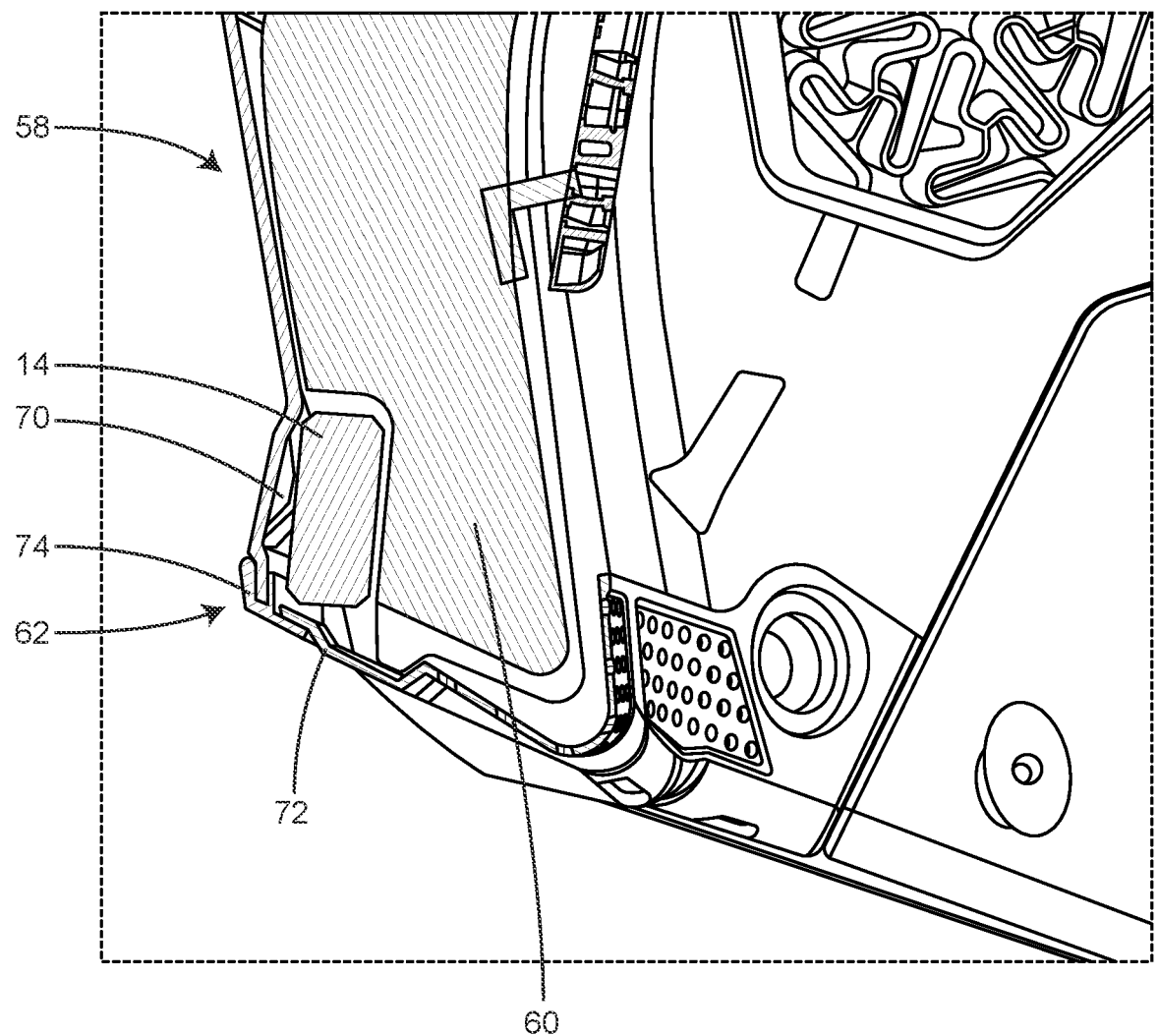
Figure 11:
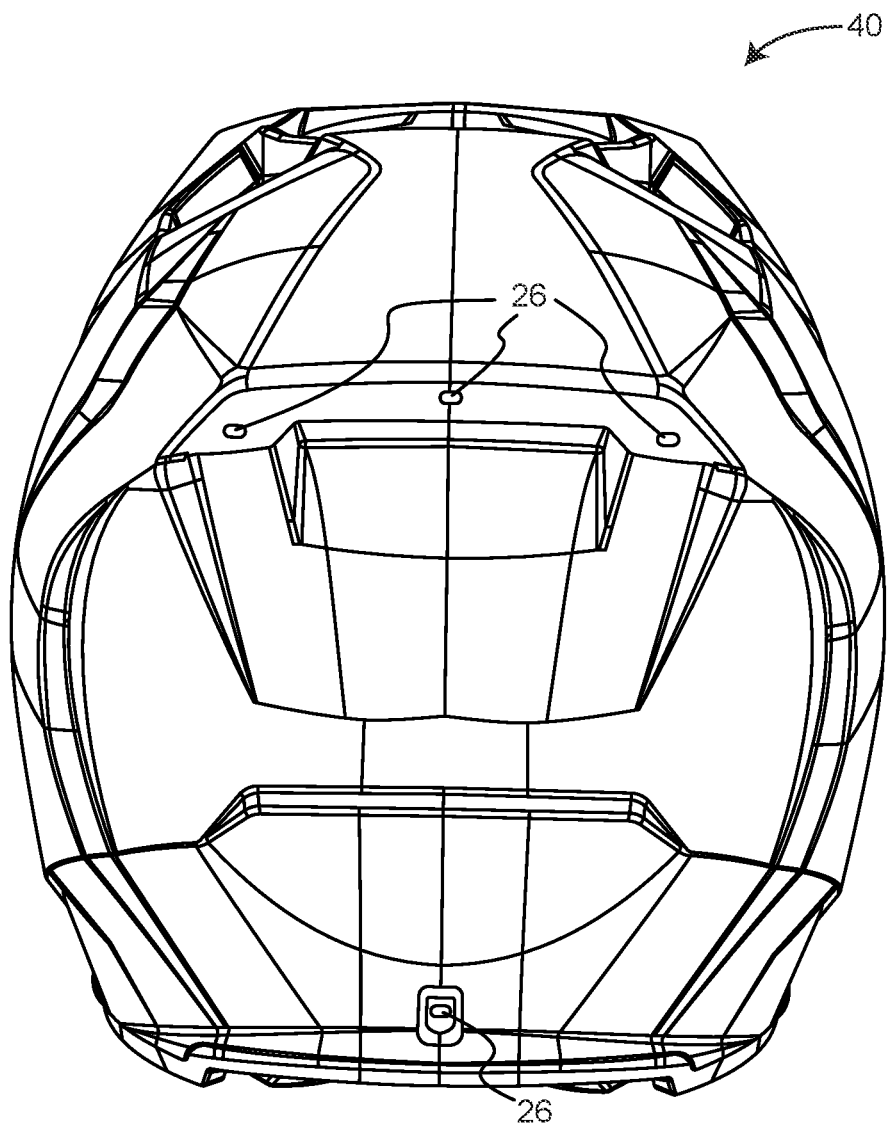
FIGS. 11-14 illustrate exemplary placements of one or more indicators on a helmet in accordance with the present disclosure.
Figure 12:
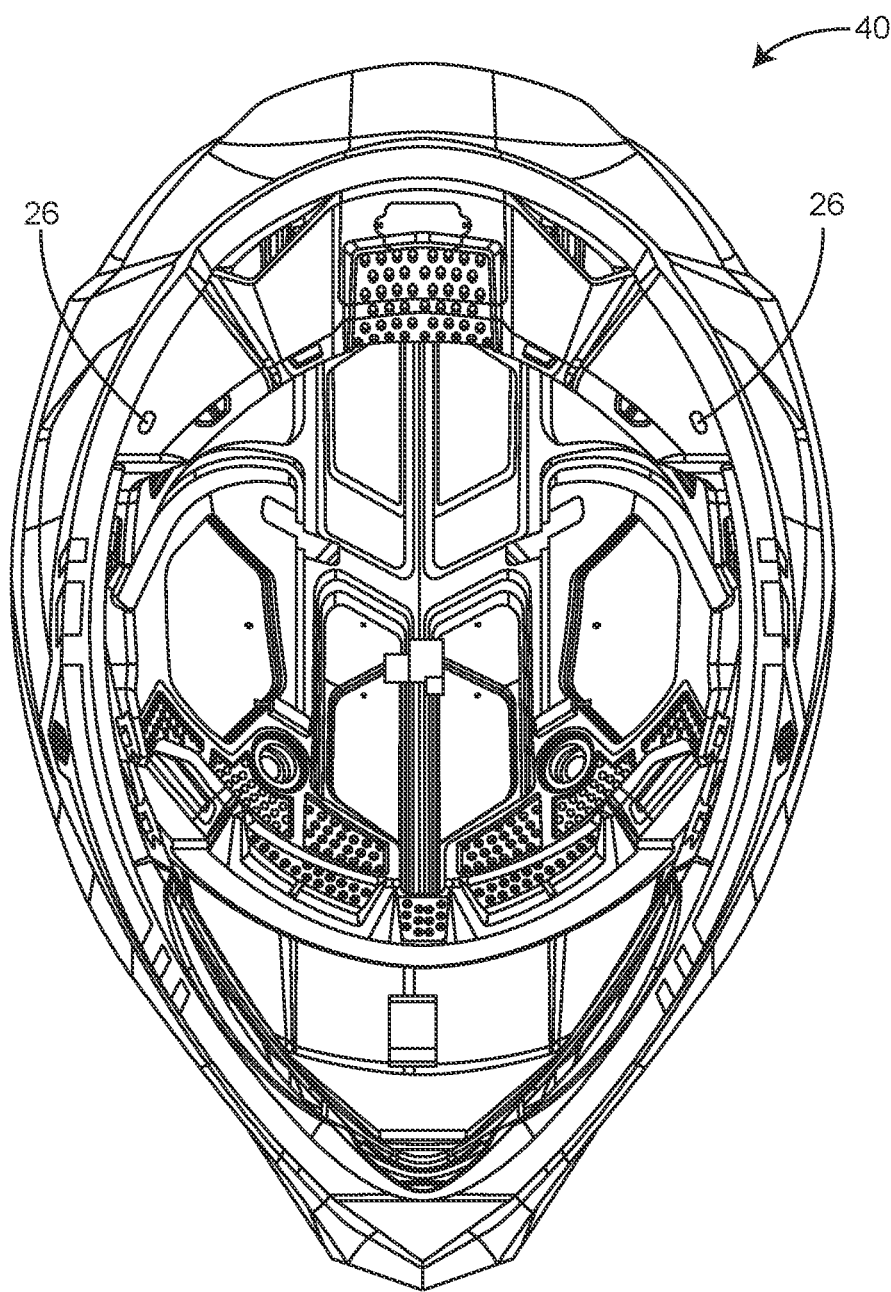

In some embodiments, the I/O interface 18 and the at least one indicator 26 of the first surface 23 of the electronic device 14 may be accessible from the outside through a first aperture 64 and a second aperture 66 from an outer surface of the accessory/gear. An exemplary first aperture 64 and a second aperture 66 for the helmet 40 as explained hereinabove is illustrated in FIGS. 7-8. As illustrated, the first aperture 64 corresponds to the at least one visual indicator 26 and the second aperture 66 corresponds to the I/O) interface 18. The first aperture 64 is configured to indicate the at least one condition indicated by the visual indicator 26 visible from outside, even though the electronic device 14 is enclosed within the holder 62. Similarly, the second aperture 66 of the outer shell 42 facilitates access of the I/O interface 18 while the electronic device 14 is enclosed within the holder 62. In some embodiments, only the at least one visual indicator is visible from the outer surface 44 of the accessory A. In such embodiments, the I/O interface 18 may be on a second surface of the electronic device 14 and may be accessible on removal of the electronic device 14 from the at least one accessory A.

The helmet 40 may further comprise a chinstrap 76 (seen e.g., in FIGS. 7-8) attached to a bottom portion 58 of each of the first side part 54 and the second side part 56 of the outer shell 42 for providing support and better fitting of the helmet 40 over the rider's head. The chinstrap 76 may comprise one or more sensors 12 to detect corresponding parameters of the rider. In some embodiments, the chinstrap 76 may comprise a haptic device H having one or more haptic sensors and a haptic indicator in corresponding straps. The haptic device is configured to be placed in any one of straps or on both straps of the chinstrap 76. The haptic sensors are configured to detect corresponding one or more parameters, for instance heartrate, respiration rate, of the rider. The one or more detected parameters are transmitted to the electronic device 14. The detected parameters may be received by the electronic device using a wired or a wireless connection.

Figure 15:
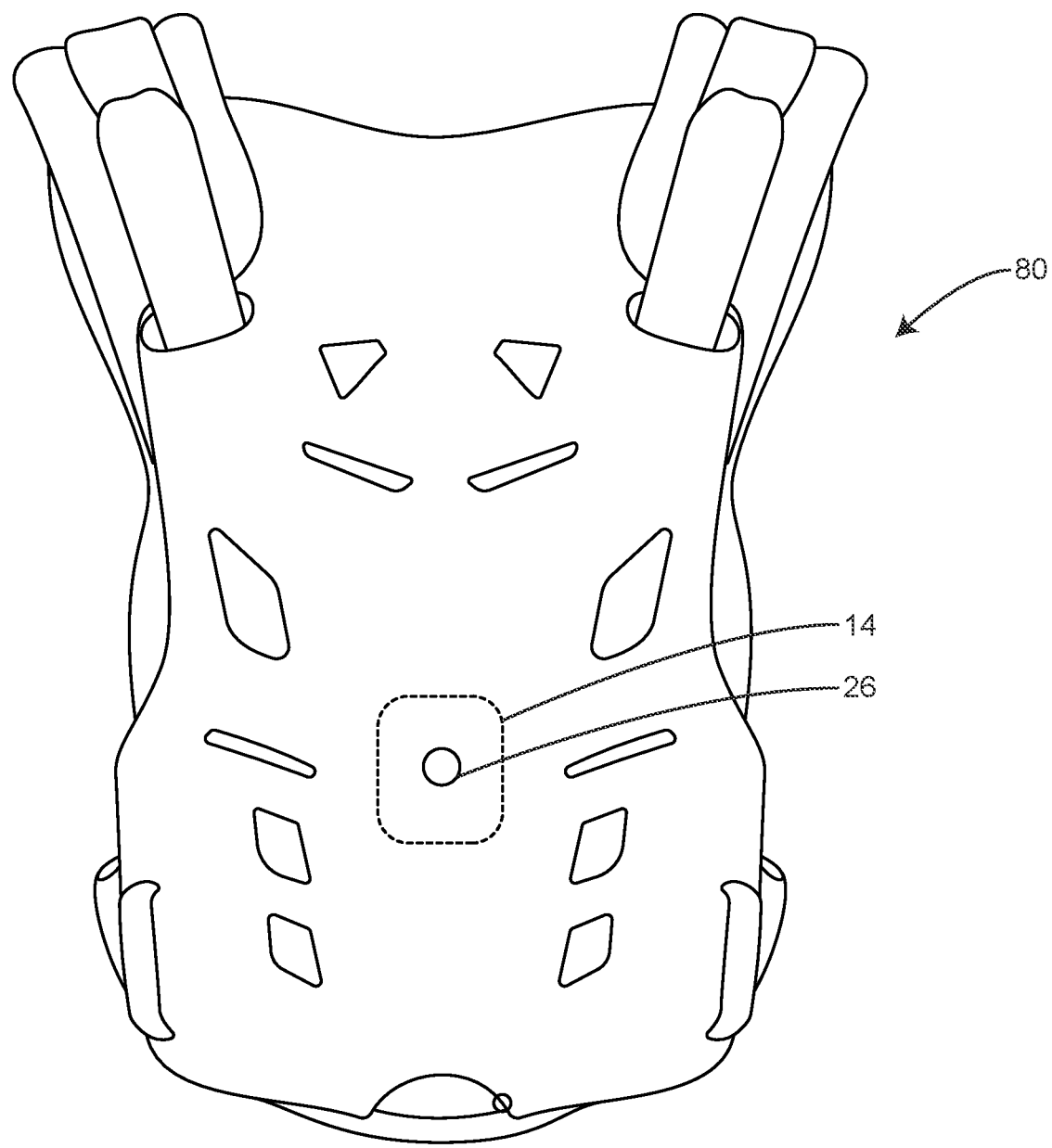
FIG. 15 illustrates an exemplary chest protector having an electronic device in accordance with the present disclosure.
Figure 16:
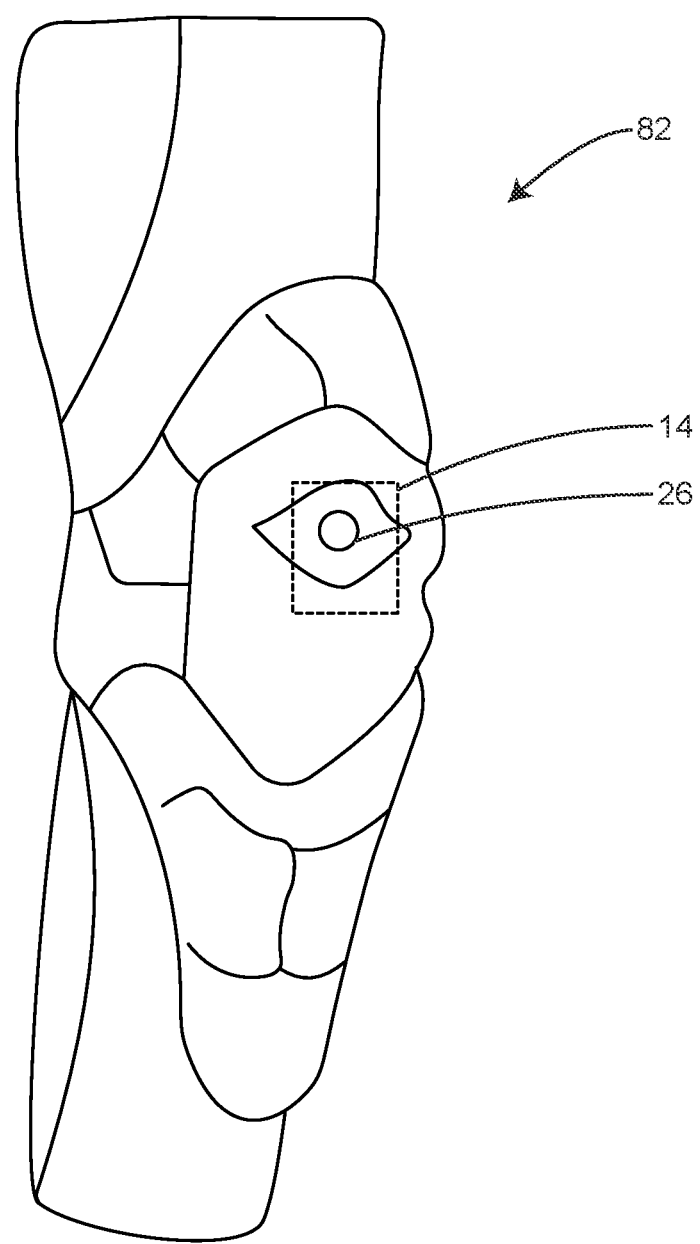
FIG. 16 illustrates an exemplary elbow pad having an electronic device in accordance with the present disclosure.
Figure 17:
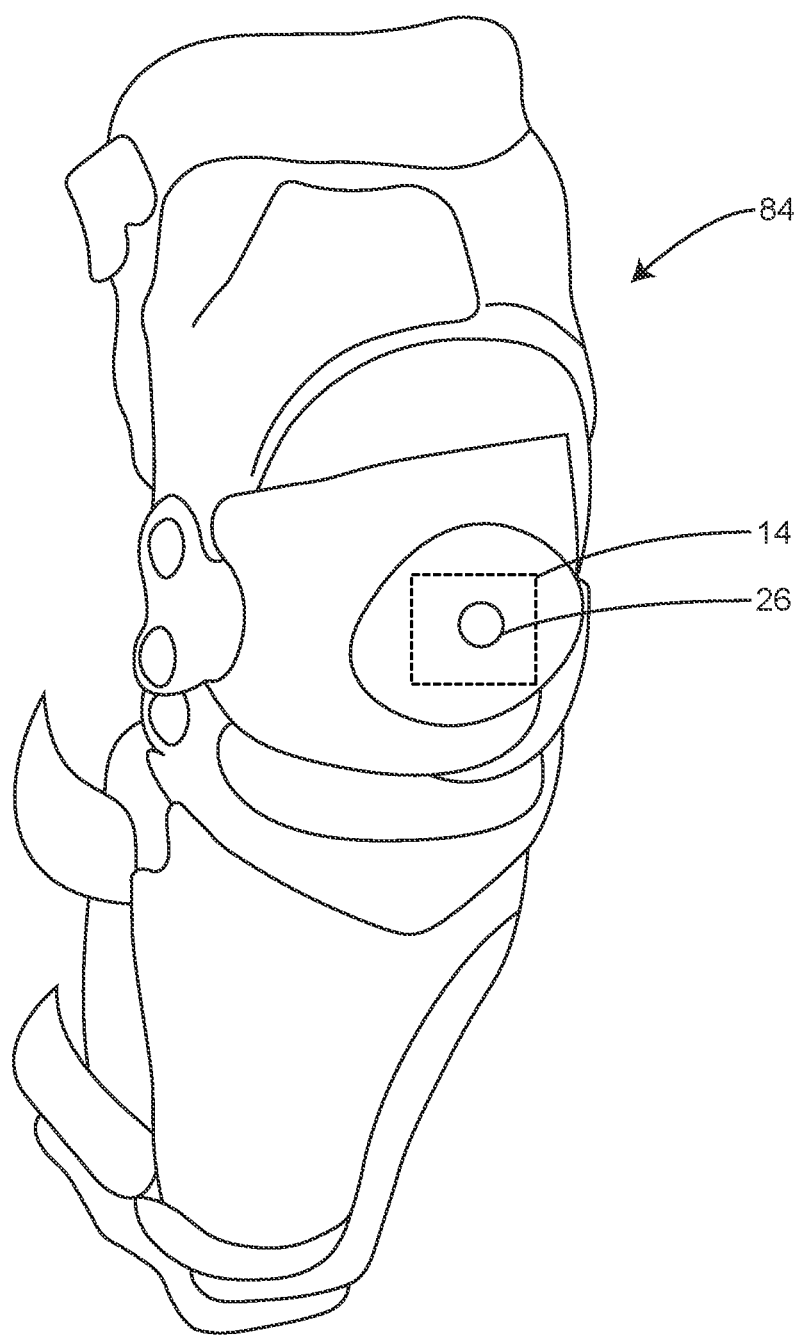
FIG. 17 illustrates an exemplary knee pad having an electronic device in accordance with the present disclosure.

It is to be noted that the electronic device 14 attached to the helmet 40 is explained for illustration purposes and does not limit the scope of the present disclosure. The electronic device 14 may be attached to different accessories/gear of the rider or the vehicle itself and may perform in the same manner as explained with respect to the helmet 40. For instance, FIGS. 15-17 illustrate exemplary accessories such as a chest protector 80, an elbow pad 82, and a knee pad 84, respectively, having electronic device 14 attached therewith. As illustrated, the electronic device 14 is attached within the accessories. The at least one visual indicator 26 of the electronic device 14 of each of the chest protector 80, the elbow pad 82, and the knee pad 84 may indicate at least one condition or performance of the rider.

The electronic device 14 is configured to generate the second set of signals corresponding to each of the one or more conditions of the rider and/or the corresponding vehicle. For instance, an elevated condition is determined if the detected parameters, e.g., values corresponding to the detected heartrate and respiration rate of the rider are high as compared to the corresponding threshold values. A sensor corresponding to an oil temperature (or coolant temperature, etc.) indicates whether a temperature of oil is within a predefined limit or not. Accordingly, the processing unit 16 is configured to generate separate second set of signals corresponding to each of the plurality of conditions of the rider and/or the corresponding vehicle.

The second set of signals may be analyzed to determine performance or at least one condition of the rider and/or the corresponding vehicle. The second set of signals may have associated values of the determined conditions that are stored in the memory unit 22 of the electronic device 14. In some embodiments, the electronic device 14, more particularly the processing unit 16, is configured to analyze the second set of signals. Optionally or in addition, the electronic device 14 is configured to translate the first set of signals into the second set of signals. The translated second set of signals may be capable of being transmitted. In other words, the translated second set of signals may represent the detected plurality of parameters in a suitable format to be translated. The electronic device 14, in such embodiment, is further configured to transmit the generated second set of signals for analysis.

In some embodiments, the electronics device 14 is configured to detect a condition and further configured to communicate an analysis of the detected one or more parameters and/or the detected condition back to the rider in real-time. For instance, referring to the haptic device on the chinstrap 76, on reception of the detected one or more parameters, the electronic device 14 is configured to compare corresponding values of the one or more detected parameters with corresponding threshold values. In case the values corresponding to the detected parameter is high or low as compared to the corresponding threshold value, a haptic alert signal is generated by the electronic device 14. The haptic alert signal may indicate a detected condition based on the detected parameters. The haptic alert signal may be transmitted to the haptic alert indicator, for instance a vibrator, for indicating the same to the rider in real-time. The vibrator, in such condition, is configured to be vibrated, thereby vibrating straps of the chinstrap 76, and thus, a chin of the rider in contact with chinstrap 76, resulting in indication of the changed parameters, e.g., respiration rate, to the rider. Based on such indication, the rider may change the performance, for example increase or decrease the respiration rate. Hence, the system provides real-time parameter detection, translation, analysis, and communication of detected one or more conditions back to the rider. It is to be noted that a placement of the haptic device is illustrated with respect to the chinstraps 76, however, the haptic device may be placed at other places, such as on the chest protector 80, the elbow pad 82, the knee pad 84, or at a portion of the vehicle. It is further to be noted that a single haptic device is illustrated, however, the system 10 may comprise more than one haptic devices working in the similar manner as disclosed hereinabove.

Referring again to FIG. 1, the system 10 may comprise one or more user devices 24 communicatively coupled to the electronic device 14. The one or more user devices 24 may be configured to receive the second set of signals and analyze the received second set of signals to determine at least one condition or performance of the rider and/or the corresponding vehicle. The analysis may be utilized, for instance, to analyze an average lap time of the rider, an average speed, different angles of inclination of the vehicle at different curves/turns on the road/track, and the like. The analysis of the corresponding vehicle may determine whether a specific part/component of the vehicle needs cleaning and/or servicing or not. The analysis may further determine at which speed the vehicle provides best efficiency. Especially in case of a sporting event, all such analysis may be utilized to train the rider to perform better or to modify the vehicle to perform better.

The one or more user devices 24 may be selected from a smart phone, a hand-held phone, a personal digital assistant (PDA), a tablet computer, a desktop computer, a smart TV, a smart wearable device, a laptop computer, and the like. The one or more user devices 24 may be connected to the electronic device 14 using a wireless communication network 28. Some non-limiting examples of the communication network 28 are Internet, Intranet, PSTN, Local Area Network (LAN), Wide Area Network (WAN), Metropolitan Area Network (MAN), and the like.

In some embodiments, for instance, in an event of an impact/accident, the one or more user devices 24 may be configured to generate an alert signal and further configured to send the generated alert signal to a nearby medical/emergency service in case the level of impact is a moderate impact or a severe impact. Optionally or in addition, one or more user devices 24 may be configured to store the second set of signals and the corresponding condition or the performance of the rider in a database 30. For the same, the one or more user devices 24 may be connected to a database 30. The analysis of the performance or the detected at least one condition of the rider and/or the corresponding vehicle may be stored in the database 30. The stored second set of signals and corresponding analysis may be retrieved from the database 30. The analysis may be used for improvement or training purposes.

The system 10 may further include a microphone and a speaker attached to at least one accessory/gear of the rider for communication with a third person using the communication network 28. In a sporting or racing event, the rider may ask for direction or other information, such as an elapsed time, a remaining time, positions of other riders, and the like, to the third person through the speaker. The third person may intimate the rider regarding such information which is received by the rider through the speaker. Optionally or in addition, the third person may intimate the rider regarding a fallen rider or any other obstacle in the path or any other riding instructions using the communication network 28. The third person may further provide intimation regarding blind zones of a track/road on which the rider is travelling. The 'blind zone' may be referred to a portion of the track/road which is not easily visible or recognizable, such as a sudden turn or a slope on the track/road. The rider may receive such intimation from the third person through the speaker. The speakers, in such embodiments, may be placed in a proximity of the rider such that the intimation is heard by the rider only. The 'third person' referred hereinabove may be any one of a coach, a manager, or a parent of the rider, and any other suitable person to provide such intimations to the rider.

In some embodiments, the system 10 may comprise a server (not shown) communicatively coupled to the electronic device 14, the one or more user devices 24, and the database 30 using the communication network 28. The server may be configured to receive the second set of signals from the electronic device 14 and further be configured to analyze the received second set of signals. In such embodiments, the analysis performed by the server may be presented to the one or more user devices 24 on a corresponding display thereof. For the same, a software application may be installed in the one or more user devices 24 to access functionalities and/or analysis of the server on the one or more user devices 24. Additionally and/or alternatively, the functionalities and/or the analysis of the server may be accessed on the one or more user devices 24 using a web browser. The server may further be configured to store and/or retrieve one or more parameters, the second set of signals, or the analysis to and/or from the database 30.

The system 10 may further comprise one or more indicators, such as indicator 26, for indicating the detected at least one condition or performance of the rider and/or the corresponding vehicle. The one or more indicators 26 may be placed at different locations on at least one accessory A of the rider and/or corresponding vehicle.

For indicating the detected at least one condition or performance on the one or more indicators 26, the electronic device 14 is configured to generate a third set of signals from the first set of signals. The third set of signals are capable of being indicated to the one or more indicators 26. In an embodiment, the electronic device 14 is configured to generate a third set of signals corresponding to each of a plurality of conditions or performance of the rider and/or the corresponding vehicle. Accordingly, the one or more indicators 26 are configured to indicate each of the one or more plurality of conditions or performance as detected by the plurality of sensors 12 separately. In other words, each of the plurality of conditions and the performance is indicated by the one or more indicators 26 differently. As the one or more indicators 26 receive the third set of signals from the electronic device 14, the one or more indicators 26 are controlled by the electronic device 14, and particularly by the processing unit 16. In other words, a mode of operation of the one or more indicators 26 is controlled by the electronic device 14.

The one or more indicators 26 are configured to indicate each of the plurality of conditions such as a normal condition, an elevated condition, an underrated condition of the rider. Moreover, the one or more indicators 26 further indicate the plurality of conditions associated with an impact or an accident, such as a minor impact, a moderate impact, a severe impact, and the like. Such indication of the detected condition of the rider facilitates a nearby person on or near the track or a person watching the racing event to know the current condition of the rider without any external communication or additional components. Further, such indication is crucial for first responders in case of an impact or an accident. For instance, if the one or more indicators 26 indicate a condition of moderate impact, the first responders may prepare their response accordingly. In case of a condition of severe impact, the first responders may be most effective in responding. Knowing a level of an impact severity upon arrival to a crash scene can greatly accelerate the physical and risk assessment for the first responders, particularly around concussion, traumatic brain injury ("TBI"), and C-Spine injuries.

The one or more indicators 26 associated with the rider may further indicate performance of the rider. For instance, in a racing event, a steady performance of the rider may be indicated with a steady signal on the one or more indicators 26, or a longer lap time may be indicated by a corresponding signal.

In some embodiments, the one or more indicators 26 associated with the vehicle may indicate at least one condition or performance of the vehicle. For instance, if a level of coolant is low or a control mechanism of the vehicle (e.g., clutch, brake, throttle, shifter, etc.) is not working properly, then a corresponding indicator may indicate such condition on the vehicle.

The one or more indicators 26 may be selected from an audio indicator, a visual indicator, or a combination thereof. In some embodiments, the one or more visual indicators may be light emitting diodes (LED) or organic light emitting diodes (OLED). In such embodiments, the plurality of conditions may be detected by indicating different colors of lights on the LEDs. For instance, in case of a minor impact, the LEDs may indicate yellow light. For moderate impact, the LEDs may indicate orange light, and for severe impact, the LEDs may indicate red light. Along with different colors of indication of the plurality of conditions, a frequency of blinking of the LEDs may also be controlled for indicating the plurality of conditions. For instance, for indicating a normal condition, the LEDs may blink at a first predefined interval. For indicating an elevated condition, the LEDs may blink at a second predefined interval. The second predefined interval is less as compared to the first predefined interval. In an embodiment, the LEDs may blink in red color and continuously to indicate a severe impact condition. It is to be noted that the color of light of the LEDs and the frequency of the blinking may be controlled by the electronic device 14, more particularly by the processing unit 16 of the electronic device 14.

Other non-limiting examples of visual indicators are special types of material such as fluorescent, incandescent, bioluminescent, and the like. The visual indicator may further include a phase change structure or material that once imparted by a certain level of impact changes a physical state or a color therefor indicating a certain impact threshold has been met. The visual indicator may be a pop-up device that, for example when impacted, pops out. An audio indicator may be a speaker capable of making announcement such that only the rider may be able to listen to the announcement.

Figure 13:
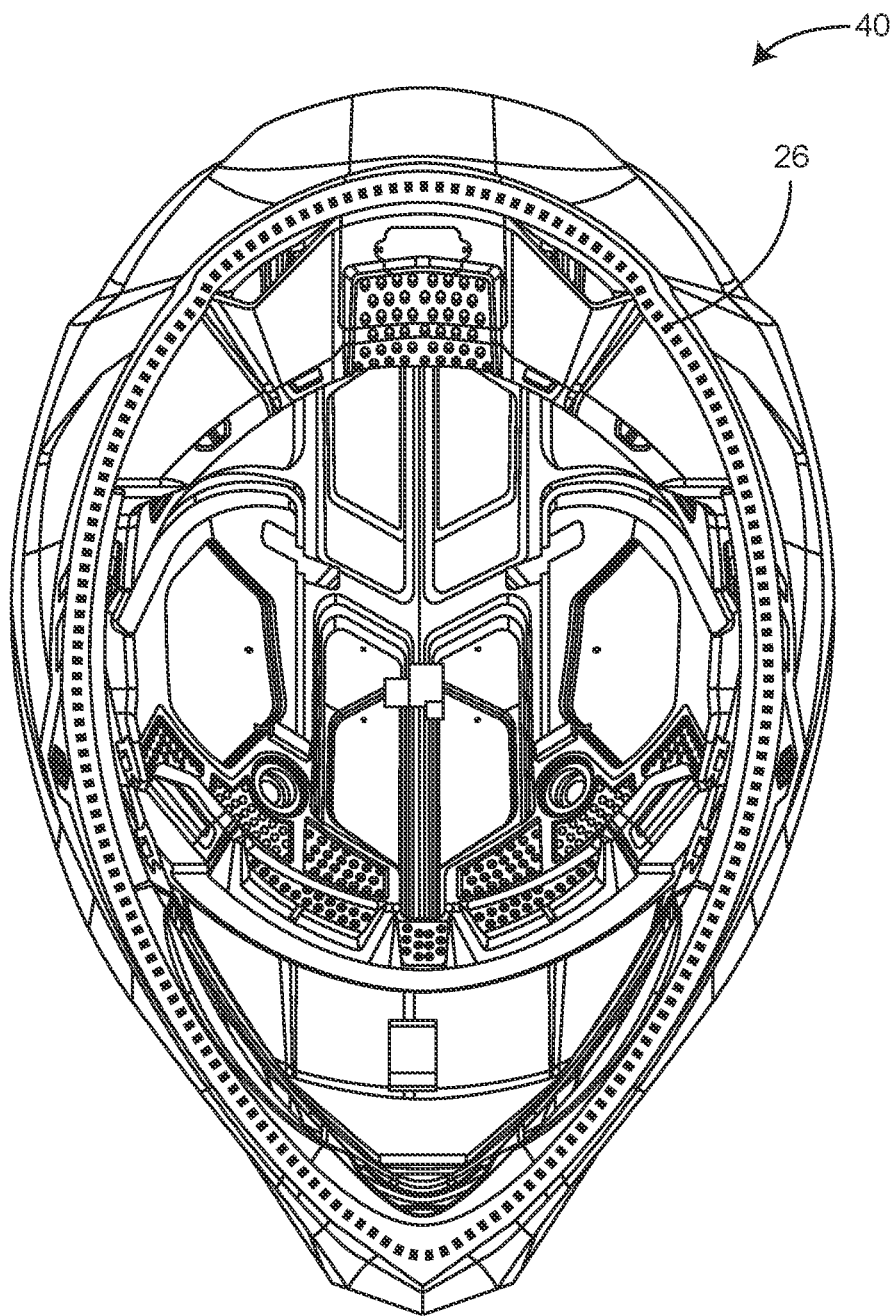
Figure 14:
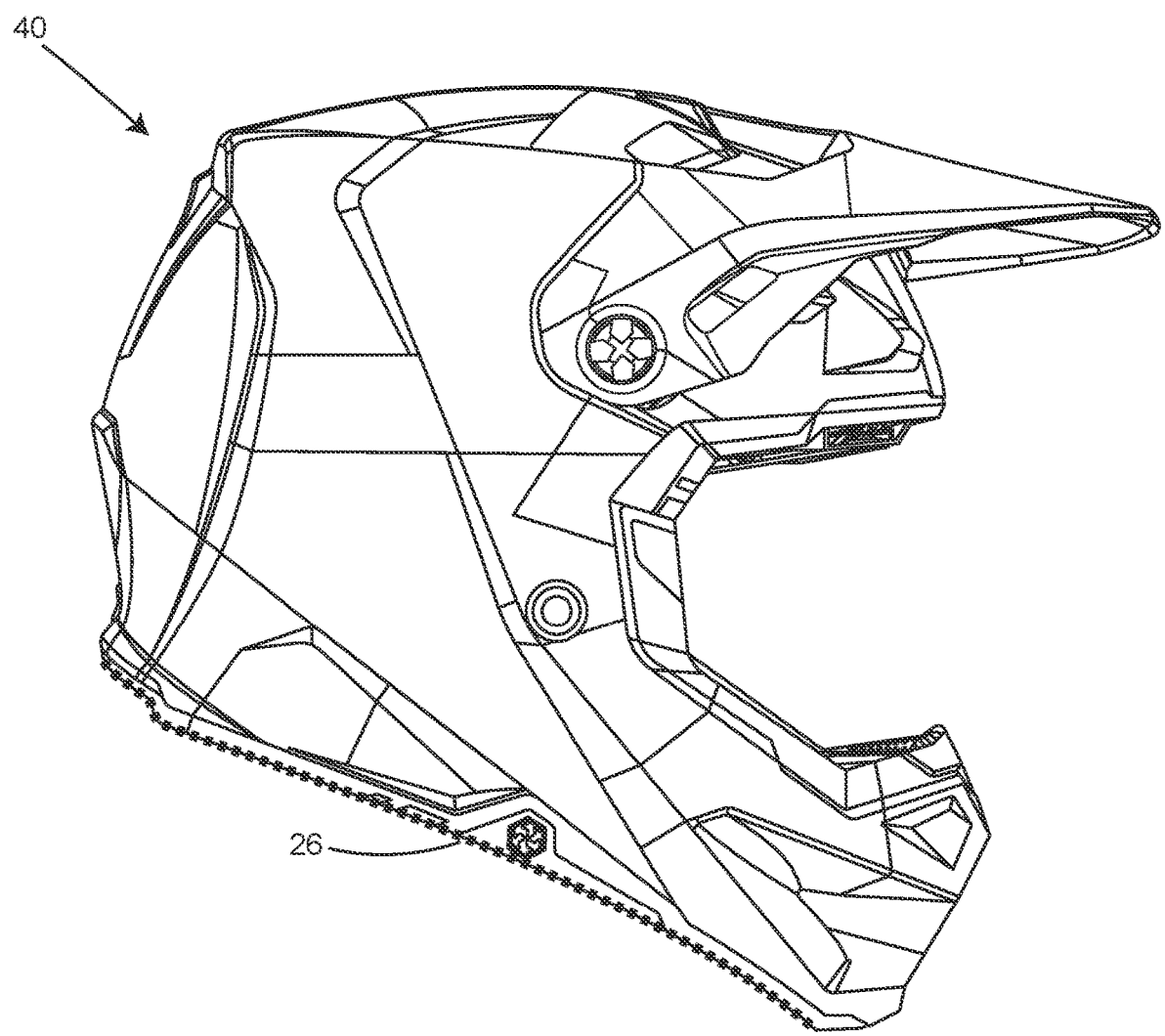

Exemplary placement of the one or more indicators 26 on a helmet 40 in accordance with the present disclosure is illustrated in FIGS. 4-5, and 11-14. The one or more indicators 26 may be placed at different locations of the outer shell 42 of the helmet 40. For instance, the one or more indicators 26 may be placed in the front part 50 and the rear part 52 of the outer shell 42 (seen e.g., in FIGS. 4-5 and 11, respectively). The one or more indicators 26 may be placed at the first side part 54 and the second side part 56 of the outer shell 42 (seen e.g., in FIG. 5). The one or more indicators may further be placed at a bottom trim of the helmet 40 (seen e.g., in FIG. 12). The one or more indicators 26 may be in form of a LED strip that can be placed at the bottom trim of the helmet 40 as shown in FIGS. 13 and 14.

In some embodiments, the rider and/or the corresponding vehicle may further comprise one or more proximity sensors. Such proximity sensors may detect if another rider or other obstacle is nearby or not. If another rider or other obstacle is nearby, then the proximity sensors generate corresponding firsts set of signals. The electronic device 14 receives the first set of signals and generate corresponding second set of signals, which may be indicated by the one or more indicators 26, for example LEDs/a LED strip, placed, for instance, at a bottom trim of a helmet 40. In such embodiments, the light emitted by the LEDs/the LED strip may be reflected from the shoulder of rider. Such reflection may facilitate elimination of a head movement of the rider and may readily alert the rider regarding the nearby rider or other obstacle. Hence, the rider may change a course of a corresponding vehicle to avoid possible collision.

It is to be noted that the one or more indicators 26 on the helmet 40 is explained for purpose of illustration and does not limit the scope of the present disclosure. The one or more indicators 26 may be placed at different locations on different accessories/gear of the rider and may indicate the at least one detected condition or the performance of the rider in the same manner as explained with respect to the helmet 40. For instance, the one or more indicators may be placed with other accessories/gear of the rider. For instance, at least one indicator 26 may be placed on the chest protector 82, the elbow pad 82, and/or the knee pad 84, as illustrated in FIGS. 15-17 for indicating at least one condition of the rider. It is to be noted that although FIGS. 15-17 depict a single indicator, the chest protector 82, the elbow pad 82, and/or the knee pad 84 may further comprise a plurality of indicators arranged at different portions thereon.

It is to be noted the one or more indicators 26 are placed such that the one or more indicators 26 are readily visible to a third person or first responders and the detected at least one condition or the performance of the rider may be determined easily by the third person or the first responders. It is further to be noted that the FIGS. 4-5 and 11-17 show LEDs as one or more indicators 26 for exemplary purpose. Other indicators as explained hereinabove may be used to provide the same effects as the LEDs.

In some embodiments, the at least one accessory A may further comprise a second indicator attached at an outer surface. In some embodiments, the second indicator may be attached to an outer surface using an adhesive material. Optionally, the second indicator may be embossed on the outer surface. The second indicator may be a warning sign for the first responders. For instance, the warning sign may indicate instructions to the first responders in case of a severe impact, such as 'Do not remove the accessory A, if a condition of the severe impact is detected.' In such cases, the first responders may respond accordingly to perform appropriate actions to save the rider's life or to mitigate long-term health effects.

In some embodiments, the electronic device 14 may be configured to receive a fourth set of signals from one or more sources via the communication network 28. The fourth set of signals may indicate one or more unsafe surrounding conditions on a path of the rider. For instance, there may be a fallen rider in a path. The one or more sources, external to the electronic device 14, may send such fourth set of signals to the electronic device 14. In some embodiments, a plurality of sensors 12 associated with a second rider may send one or more signals if the second rider has fallen. Optionally, sensors placed on a path of the rider may indicate any obstacle in the path ahead of the rider.

The electronic device 14 may receive such fourth set of signals and generate a corresponding fifth set of signals. The generated fifth set of signals may be transmitted to the one or more indicators 26. The one or more indicators 26, based on the received fifth set of signals, indicate one or more unsafe surrounding conditions. In an embodiment, the one or more indicators 26 may be configured to indicate each of the one or more unsafe surrounding conditions.

In some embodiments, the system 10 may further comprise a camera placed at a suitable position on the at least one accessory A or on the corresponding vehicle to capture a plurality of images or videos of a rear path of the rider. The captured images or videos may be shown to the rider. In such embodiments, the captured images or videos may be shown partially on a visor of a helmet. Optionally, the captured images or videos may also be shown on a separate screen attached to the helmet at a suitable position. The captured images or videos may further be shown on a screen attached to a steering or a handle of the corresponding vehicle of the rider.

Figure 18:
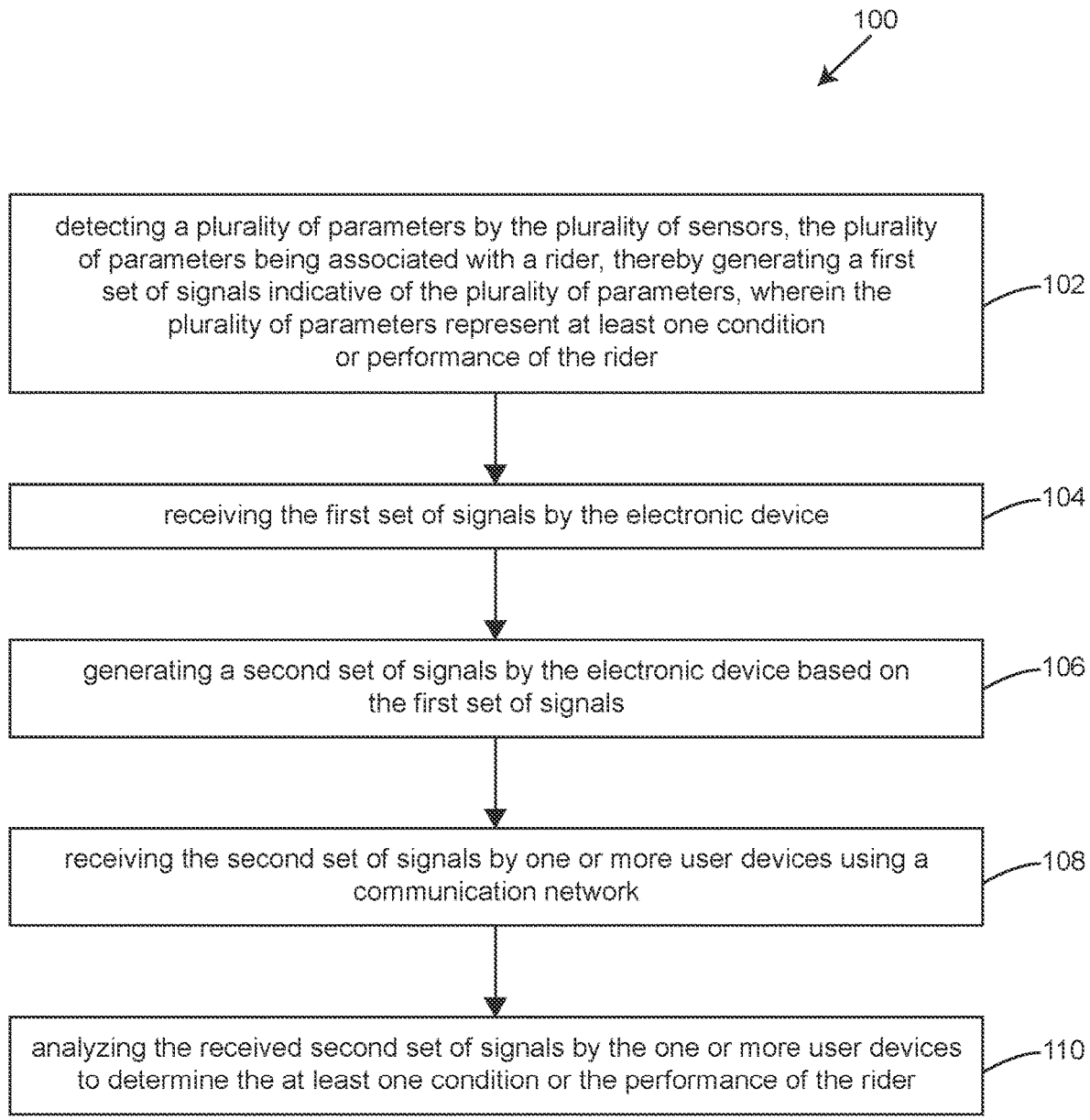
FIG. 18 illustrates an exemplary method for monitoring vehicle drivers in accordance with the present disclosure.

According to a second aspect of the present disclosure, a method of monitoring vehicle riders using a system 10 is disclosed. FIG. 18 illustrates an exemplary method 100 in accordance with the present disclosure. It is to be noted that the method 100 is being performed using the system 10 as disclosed hereinabove. Accordingly, all components of the system 10 are included and used in performing the method. Therefore, the system 10 comprises a plurality of sensors 12 for sensing a plurality of parameters associated with a rider and an electronic device 14 comprising a processing unit 16 and a transceiver 20. The plurality of sensors 12 may be communicatively coupled with the electronic device 14. In some embodiments, the plurality of sensors 12 may have wired connection with the electronic device 14. Optionally, the plurality of sensors 12 may have wireless connection with the electronic device 14. The system 10 may further comprise one or more indicators 26 for indicating at least one condition or performance of the rider and one or more user devices 24 for analyzing the at least one condition or the performance of the rider. In some embodiments, the plurality of sensors 12 may be coupled with at least one accessory/gear of the rider. Optionally or in addition, the plurality of sensors 12 may be coupled with a corresponding vehicle of the rider.

The method 100 may start with step 102 in which the plurality of sensors 12 detect one or more parameters of a rider. In some embodiments, the plurality of parameters may be associated with biometric data of the rider. Optionally or in addition, the plurality of sensors 12 may be associated with one or more external conditions affecting the rider, such as external impact or external vibrations. Some non-limiting examples of the plurality of sensors 12 are temperature sensor, heartrate sensor, VO$_2$ measurement sensor, O$_2$ measurement sensor, hydration sensor, accelerometer, and the like. The plurality of sensors 12 may be configured to generate a first set of parameters based on the detected plurality of parameters. In some embodiments, the first set of parameters may be a combination of the detected plurality of parameters. In some embodiments, the plurality of sensors 12 may be configured to detect the plurality of parameters continuously. Optionally, the plurality of sensors 12 may detect the plurality of parameters at a predefined interval. In further embodiments, the plurality of sensors 12 may be configured to detect the associated parameters on occurrence of a specific event, such as an impact/accident.

In step 104, the electronic device 14 may be configured to receive the first set of signals. As mentioned earlier, the electronic device 14 may be in a wired or a wireless connection with the plurality of sensors 12 to receive the first set of signals. In an embodiment, the electronic device 14 may determine an instance for the plurality of sensors 12 to detect the relevant parameters. For instance, in case of detection of heavy vibrations from a vibration sensor, the processing unit 16 may generate a detecting signal directing other sensors, e.g., a heartrate sensor, or a respiration sensor, to sense the corresponding parameters, such as a heartrate or a respiration rate, of the rider to determine the condition of the rider.

In step 106, a second set of signals are configured to be generated by the electronic device 14 based on the first set of signals. In particular, the first set of signals are configured to be converted or translated to a second set of signals by the electronic device 14. The second set of signals may be capable of being transmitted. In other words, the electronic device 14 converts/translates the first set of signals into a suitable format to be transmitted.

In step 108, the generated second set of signals are received by the one or more user devices 24 using a communication network 28. Some non-limiting examples of the one or more user devices 24 are a smart phone, a hand-held phone, a personal digital assistant (PDA), a tablet computer, a desktop computer, a smart TV, a smart wearable device, a laptop computer, and the like. The one or more user devices 24 may be connected to the electronic device 14 using a wired or a wireless communication network 28. Some non-limiting examples of the communication network 28s are Internet, Intranet, PSTN, Local Area Network (LAN), Wide Area Network (WAN), Metropolitan Area Network (MAN), and the like.

In step 110, the one or more user devices 24 are configured to analyze the second set of signals. The step of analysis includes determining whether the detected parameters corresponding to the second set of signals are within corresponding predefined range or not. The second set of signals may further be analyzed to determine at least one condition of the rider during or after a significant event. For instance, in a racing event, a heartrate or a respiration rate is determined and analyzed with respect to a corresponding predefined threshold value. The significant event may be race position. Further, in case of an accident or impact, such parameters are analyzed to check a condition of the rider and/or a level of the accident or impact. In some embodiments, the one or more user devices 24 may be configured to send an alert signal to a nearby medical/emergency service in case the level of impact is a moderate impact or a severe impact. Optionally or in addition, one or more user devices 24 may be configured to store the second set of signals and the corresponding condition or the performance of the rider in a database 30. The stored second set of signals and the corresponding condition or the performance may be utilized for training of the rider to perform better in future events.

In some embodiments, the method comprises the step of detecting a plurality of parameters associated with a corresponding vehicle of the rider. In such embodiments, some of the plurality of sensors 12 are coupled with the corresponding vehicle and are configured to measure corresponding parameters associated with the corresponding vehicle. Some non-limiting examples of such parameters are decreasing speed or lap times, airtime (i.e., time on the ground versus time off the ground), a level and/or temperature of vehicle coolant, performance of a clutch, oil temperature, an engine speed, performance of a braking mechanism, an acceleration, cornering, jumping of the vehicle, lap segment times, and the like. Accordingly, the detected parameters associated with such sensors may be utilized to detect performance or at least one condition associated with the vehicle.

The method may further comprise step of generating a third set of signals based on the first set of signals by the electronic device 14. The third set of signals may indicate one or more conditions or the performance of the rider and/or the corresponding vehicle. The third set of signals may be received by one or more indicators 26 communicatively coupled with the electronic device 14. In an embodiment, the one or more indicators 26 are configured to be placed on an outer surface 44 of at least one accessory/gear of the rider or on an outer surface 44 of the corresponding vehicle. The one or more indicators 26 are configured to indicate at least one condition or performance of the rider and/or the corresponding vehicle. Accordingly, the one or more indicators 26 on the at least one accessory/gear may indicate the condition or the performance of the rider and the indicators on the vehicle ma indicate the condition or the performance of the vehicle. The one or more indicators 26 are configured to be placed such that a third person or first responders may readily determine the condition or the performance of the rider and/or the corresponding vehicle. In case of impact or accident, such indication facilitates the first responders to have a preliminary understanding regarding the impact or the accident.

In some embodiments, the method further comprises the steps of facilitating storing of the first set of signals in a memory unit 22 of the electronic device 14 and retrieval of the stored first set of signals from the memory using an I/O interface 18 for analysis. In other embodiments, the memory unit 22 may be configured to store a predefined threshold value of each of the plurality of parameters. The processing unit 16 may compare a value associated with each of the received first set of signals to the predefined threshold value. Such comparison may determine whether the detected parameters are within a specified limit or not. The specified limit may be a standard limit for a parameter.

In some embodiments, the method may facilitate a communication of the rider with a third person using the communication network 28. In such embodiments, the system 10 comprises a microphone and a speaker. The third person may intimate the rider regarding a fallen rider or any other obstacle in the path or any other riding instructions using the communication network 28. The rider may receive the intimation through the speaker. The speakers, in such embodiments, may be placed within the helmet 40 such that the intimation is heard by the rider only.

It is to be noted that different values and parameters mentioned in the description are exemplary in nature and are not intended to bound the specification in any manner.

Finally, while the present invention has been described above with reference to various exemplary embodiments, many changes, combinations, and modifications may be made to the exemplary embodiments without departing from the scope of the present invention. For example, the various components may be implemented in alternative ways. These alternatives can be suitably selected depending upon the particular application or in consideration of any number of factors associated with the operation of the device. In addition, the techniques described herein may be extended or modified for use with other types of devices. These and other changes or modifications are intended to be included within the scope of the present invention.

What is claimed is:

1. A system for monitoring vehicle riders, the system comprising:
    a plurality of sensors configured to detect a plurality of parameters associated with a rider, and further configured to generate a first set of signals indicative of the plurality of parameters, wherein the plurality of parameters represents at least one condition or performance of the rider, wherein the plurality of sensors is placed on at least one of elbow protective gear, knee protective gear, chest protective gear, and boot protective gear that engage with torso or limbs of the rider, wherein the elbow, knee, chest, and boot protective gear refers to specific impact protective members that are utilized by the rider to get protection from different external effects at the specific location of the respective protective gear;
    an electronic device communicatively coupled to the plurality of sensors, the electronic device comprising a processing unit and a transceiver, the electronic device configured to receive the first set of signals from the plurality of sensors, and further configured to generate a second set of signals; and
    a microphone and a speaker for facilitating a communication of the rider with another person using one or more user devices via a communication network, the other person having real-time impact and biometric data of the rider from the plurality of sensors.

2. The system of claim 1, wherein the plurality of sensors is configured to detect a plurality of engine parameters associated with a corresponding vehicle of the rider, the plurality of parameters associated with the corresponding vehicle represent at least one condition or performance of the vehicle.

3. The system of claim 1, further comprises one or more user devices communicatively coupled to the electronic device using a communication network, wherein the one or more user devices are configured to receive the second set of signals, and further configured to analyze the received second set of signals to determine the at least one condition or the performance of the rider.

4. The system of claim 1, wherein the plurality of sensors is further placed on the vehicle to detect the plurality of parameters.

5. The system of claim 1, wherein the electronic device is configured to generate a third set of signals indicative of one or more biometric conditions of the rider based on the first set of signals.

6. The system of claim 5, further comprising one or more indicators communicatively coupled to the electronic device, the one or more indicators configured to receive the third set of signals from the electronic device and further configured to generate a corresponding indication associated with each of the one or more conditions of any one of the rider and the vehicle, the one or more indicators including at least one indicator placed on at least one of the elbow protective gear, the knee protective gear, the chest protective gear, and the boot protective gear.

7. The system of claim 1, wherein the electronic device is configured to receive a fourth set of signals from one or more sources via the communication network, and further configured to generate a fifth set of signals, the fourth set of signals indicative of one or more unsafe surrounding conditions external to the rider.

8. The system of claim 7, wherein the one or more sources comprise at least one of a second set of sensors of a second rider and a third set of sensors placed on a path of the rider and a combination thereof.

9. The system of claim 7, wherein one or more indicators are configured to receive the fifth set of signals and further configured to indicate the one or more unsafe surrounding conditions corresponding to the fourth set of signals.

10. The system of claim 1, wherein the electronic device comprises a memory unit for storing the first set of signals, wherein the stored first set of signals are configured to be retrieved from the memory unit using an I/O interface.

11. The system of claim 1, wherein the plurality of sensors, including sensors placed on at least one of the knee, elbow, chest, and boot protective gear is connected to the electronic device by any one of a wired connection and a wireless connection, the sensors providing impact data to the electronic device.

12. The system of claim 1, wherein the electronic device is configured to be placed at any one of the one or more of the elbow protective gear, the knee protective gear, the chest protective gear, and the boot protective gear.

13. The system of claim 1, comprises a haptic device having one or more haptic sensors for detecting one or more parameters, the haptic device being configured to be in communication with the electronic device to transmit the one or more detected parameters.

14. The system of claim 13, wherein the electronic device is configured to detect a condition of any one of the rider and a corresponding vehicle, generate a haptic alert signal corresponding to the detected condition, and is further configured to transmit the generated haptic alert signal to the haptic indicator in real-time.

15. The system of claim 14, wherein the haptic indicator is a chinstrap vibrator, the haptic indicator being configured to indicate the generated haptic alert signal, and consequently the detected condition to the rider in real-time.

16. The system of claim 13, wherein the haptic device is placed on any one of the one or more of the elbow protective gear, the knee protective gear, the chest protective gear, and the boot protective gear to sense biometric data of the rider.

17. The system of claim 1, wherein the one or more body impact-protective accessories comprise at least one of boots, armor suits, chest protectors, pads, elbow pads, or combination thereof.

18. The system of claim 1, wherein the electronic device is further configured to generate one or more detecting signals when an instance is detected and trigger one or more of the plurality of sensors to detect corresponding parameters representing the at least one biometric condition or performance of the rider.

19. The system of claim 1, wherein the electronic device further comprises at least one visual indicator configured to indicate a biometric condition or performance of the rider.

20. The system of claim 1, further comprising a second indicator attached to an outer surface of one or more of the knee protective gear, the elbow protective gear, the chest protective gear for indicating warning instructions for first responders.

21. The system of claim 1, wherein the plurality of sensors includes at least one telemetry sensor secured to at least one of the chest protective gear, the elbow protective gear, the knee protective gear and the boot protective gear, the at least one telemetry sensor senses position and movement relative to a head, limb, or chest of the rider.

22. The system of claim 21, wherein the vehicle is two-wheel vehicle, the system further comprising a vehicle telemetry sensor secured to the vehicle, the electronic device for receiving signals from both the at least one telemetry sensor and the vehicle telemetry sensor for providing comparative telemetry data.

23. The system of claim 21, wherein the at least one telemetry sensor comprises at least one sensor on the knee protective gear and at least one sensor on the chest protective gear.

24. The system of claim 21, wherein the at least one telemetry sensor comprises at least one sensor on the elbow protective gear.

25. The system of claim 21, wherein the at least one telemetry sensor comprises at least one sensor on the chest protective gear.

26. The system of claim 21, wherein the electronic device receives telemetry data from the at least one telemetry sensor.

27. A method for monitoring vehicle riders, the method being performed on a system comprising a plurality of sensors and an electronic device including a processing unit and a transceiver, the method comprising:
detecting a plurality of parameters by the plurality of sensors, the plurality of parameters being associated with a rider, thereby generating a first set of signals indicative of the plurality of parameters, wherein the plurality of parameters represents at least one condition or performance of the rider, wherein the plurality of sensors is placed on at least one of elbow protective gear, knee protective gear, chest protective gear, and boot protective gear that engage with torso or limbs of the rider, wherein the elbow, knee, chest, and boot protective gear refers to specific impact protective members that are utilized by the rider to get protection from different external effects at the specific location of the respective protective gear;
receiving the first set of signals by the electronic device;
generating a second set of signals by the electronic device based on the first set of signals;
generating a third set of signals by the electronic device, the third set of signals indicative of one or more conditions of the rider at the rider's knee, elbow, or chest based on the first set of signals;
receiving the third set of signals by one or more indicators from the electronic device; and
generating a corresponding indication on the one or more indicators, the indication being associated with the one or more biometric conditions of the rider.

28. The method of claim 27, further comprising:
receiving the second set of signals by one or more user devices using a communication network; and
analyzing the received second set of signals by the one or more user devices to determine the at least one condition or the performance of the rider, including condition or performance of a limb and/or torso of the rider.

29. The method of claim 27, further comprising detecting a plurality of parameters associated with a corresponding vehicle of the rider, the plurality of parameters associated with the corresponding vehicle represent at least one condition or performance of the vehicle engine.

30. The method of claim 27, wherein the electronic device is placed on at least one of the knee protective gear, the elbow protective gear, the chest protective gear, and the boot protective gear.

31. The method of claim 27, comprising:
facilitating storing of the first set of signals in a memory unit of the electronic device, the electronic device being placed at one or more of the knee protective gear, the elbow protective gear, the chest protective gear; and
facilitating retrieval of the stored first set of signals from the memory using an I/O interface.

32. The method of claim 27, comprising facilitating a communication of the rider with a third person via the communication network using one or more user devices by a microphone and a speaker, the third person having real-time access to sensed rider data.

33. The method of claim 27, wherein the plurality of sensors receives telemetry data from at least one of the chest protective gear, the elbow protective gear, the knee protective gear, and the boot protective gear, the data being received by the electronic device for providing telemetry performance information of the position and movement of a vehicle rider.

34. A method for monitoring vehicle riders, the method being performed on a system comprising a plurality of sensors and an electronic device including a processing unit and a transceiver, the method comprising:
detecting a plurality of parameters by the plurality of sensors, the plurality of parameters being associated with a rider, thereby generating a first set of signals indicative of the plurality of parameters, wherein the plurality of parameters represents at least one condition or performance of the rider, wherein the plurality of sensors is placed on at least one of elbow protective gear, knee protective gear, chest protective gear, and boot protective gear that engage with torso or limbs of the rider, wherein the elbow, knee, chest, and boot protective gear refers to specific impact protective members that are utilized by the rider to get protection from different external effects at the specific location of the respective protective gear;
receiving the first set of signals by the electronic device;
generating a second set of signals by the electronic device based on the first set of signals;
receiving the second set of signals by one or more user devices using a communication network;
analyzing the received second set of signals by the one or more user devices to determine the at least one condition or the performance of the rider, including condition or performance of a limb and/or torso of the rider; and
storing the second set of signals in a database, the database being in communication with the one or more user devices, the signals including data regarding rider position correlated with rider biometric data.

* * * * *